United States Patent
Hatano et al.

(10) Patent No.: US 7,433,408 B2
(45) Date of Patent: *Oct. 7, 2008

(54) ENCODING SYSTEM AND ENCODING METHOD

(75) Inventors: Yoshiko Hatano, Tokyo (JP); Takashi Nakao, Tokyo (JP); Junko Kijima, Tokyo (JP); Mamoru Inamura, Tokyo (JP); Kazuhiro Sugiyama, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 945 days.

This patent is subject to a terminal disclaimer.

(21) Appl. No.: 10/834,264

(22) Filed: Apr. 29, 2004

(65) Prior Publication Data

US 2004/0240558 A1 Dec. 2, 2004

Related U.S. Application Data

(62) Division of application No. 09/842,772, filed on Apr. 27, 2001, now Pat. No. 6,792,046.

(30) Foreign Application Priority Data

Apr. 27, 2000 (JP) ............................. 2000-127291

(51) Int. Cl.
   *H04N 7/12* (2006.01)
   *H04N 11/02* (2006.01)
   *G06K 9/36* (2006.01)
(52) U.S. Cl. ................ 375/240.24; 382/236; 348/419.1
(58) Field of Classification Search ............ 375/240.24, 375/240.07, 240.13, 240.23; 348/420, 419.1; 382/232, 236

See application file for complete search history.

(56) References Cited

U.S. PATENT DOCUMENTS

| 5,631,644 | A | 5/1997 | Katata et al. |
| 5,995,151 | A | 11/1999 | Naveen et al. |
| 6,044,396 | A | 3/2000 | Adams |

(Continued)

FOREIGN PATENT DOCUMENTS

EP      0 660 612 A1    6/1995

(Continued)

OTHER PUBLICATIONS

Vetro, A. et al.: "MPEG-4 Rate Control for Multiple Video Objects," IEEE Transactions on Circuits and Systems for Video Technology, IEEE, Inc. New York, vol. 9, No. 1, Feb. 1999, pp. 186-199.

(Continued)

*Primary Examiner*—Gims S Philippe
(74) *Attorney, Agent, or Firm*—Birch, Stewart, Kolasch & Birch, LLP

(57) ABSTRACT

An encoding system capable of preventing the overflow of a buffer and performing the encoding of a VOP within a predetermined time period even where the processing time period necessary for encoding each macroblock is not constant. In order to provide the encoding system, the maximum number of bits Tmax is set for each VOP, and the output of encoding unit and the output of fixed code output unit is switched and outputted so that the number of bits Sc of the VOP may not exceed the Tmax.

21 Claims, 19 Drawing Sheets

U.S. PATENT DOCUMENTS

| | | |
|---|---|---|
| 6,094,455 A | 7/2000 | Katta |
| 6,188,700 B1 | 2/2001 | Kato et al. |
| 6,263,020 B1 | 7/2001 | Gardos et al. |
| 6,366,614 B1 | 4/2002 | Pian et al. |
| 6,366,704 B1 | 4/2002 | Ribas-Corbera et al. |
| 6,888,967 B2 * | 5/2005 | Sugahara et al. ............ 382/232 |

FOREIGN PATENT DOCUMENTS

| | | |
|---|---|---|
| EP | 0 836 329 A1 | 4/1998 |

OTHER PUBLICATIONS

Villasenor, John D., et al., "Robust Video Coding Algorithms and Systems"—Proceedings of the IEEE, vol. 87, No. 10-, Oct. 1999.

Wiegand, T. et al.: "Rate-Distortion Optimized Mode Selection for Very Low Bit Rate Video Coding." IEEE Transactions on Circuits and Systems for Video Technology, IEEE Inc., New York, vol. 6, No. 2, Apr. 1, 1996.

Chinese Office Action dated Mar. 12, 2004 with English Translation.

Telecommunication Standardization Sector of ITU, "Transmission of Non-Telephone Signals," ITU-T Recommendation H.262, International Tellecomunication Union, XP 000198491.

* cited by examiner

FIG.3
(a) Bitstream of One VOP
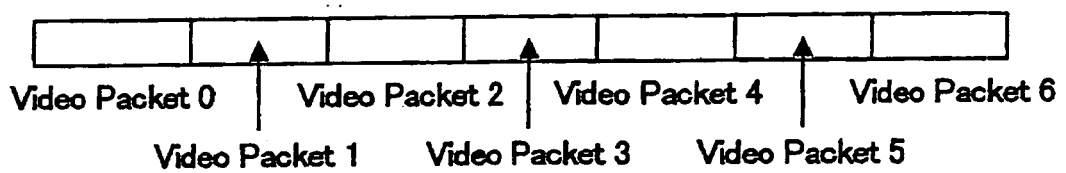
(b) Bitstream of Video Packet 0
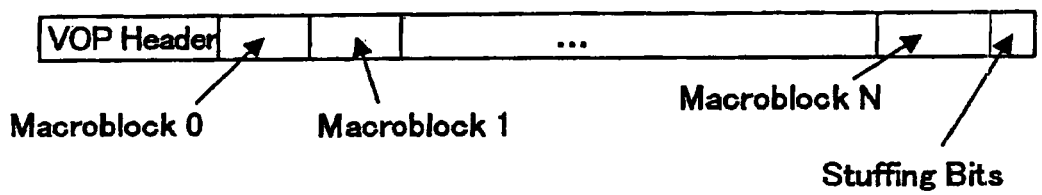
(c) Bitstream of Video Packet 1
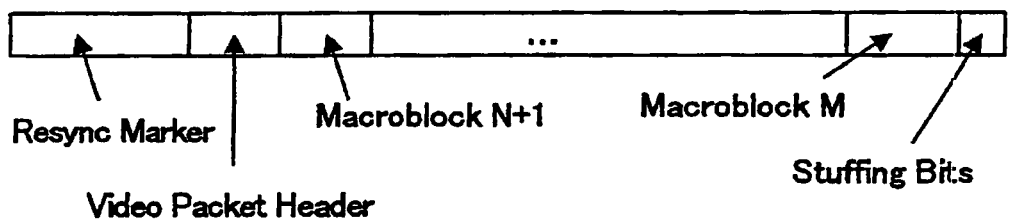
(d) Bitstream with Stuffing Data
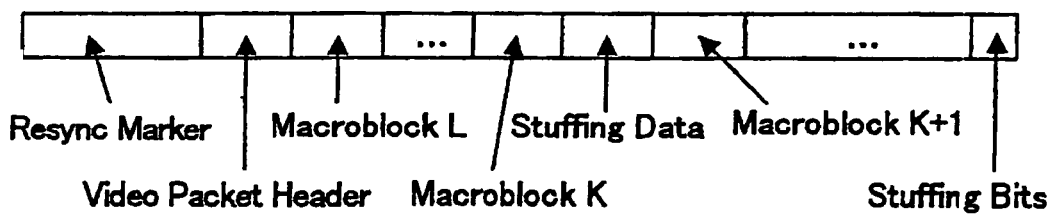

ENCODING SYSTEM AND ENCODING METHOD

This application is a Divisional of application Ser. No. 09/842,772, filed on Apr. 27, 2001, now U.S. Pat. No. 6,792,046 and for which priority is claimed under 35 U.S.C. § 120; and this application claims priority of Application No. 127291/2000 filed in Japan on Apr. 27, 2000 under 35 U.S.C. § 119; the entire contents of all are hereby incorporated by reference.

BACKGROUND OF THE INVENTION

1. Field of the Invention

This invention relates to an encoding system and an encoding method for a mobile telephone or a TV telephone system, for example, to encode video signals in real time.

2. Description of the Related Art

FIG. 1 is a block diagram of an encoding system of the background art, as disclosed on pp. 39 to pp. 40 of "All of MPEG-4" (Association of Industrial Search), for example; FIG. 2 is an explanatory view showing an input signal of this encoding system of the background art; FIGS. 3a to 3d are explanatory diagrams showing constructions of bitstreams; and FIG. 4 is an explanatory diagram showing positions (arrangements) on a screen (in a displayed state) of a video packet.

In FIG. 1, reference numeral 1 designates a subtracter for receiving an external input signal (e.g., a luminance signal and two chrominance signals in the shown example) as its first input. The output of the subtracter 1 is inputted through DCT (Discrete Cosine Transformer) 2 and quantizer 3 to a DC/AC predictor 4 for predicting the quantized values of a DC component and an AC component, and dequantizer 6. The output of the DC/AC predictor 4 is fed to the first input of variable length coder 5, which outputs a bitstream.

On the other hand, the output of the dequantizer 6, to which the output of the quantizer 3 is inputted, is fed through IDCT 7 (IDCT: Inverse DCT)to the first input of an adder B. The output of this adder 8 is fed to a memory 9, the output of which is fed to the first input of predicted image former 10 and the first output of a motion detector 11.

An external input signal is fed to the second input of the motion detector 11, the output of which is fed to the second input of the predicted image former 10 and a motion vector predictor 12.

The output of the motion vector predictor 12 is fed to the second input of variable length coder 5. On the other hand, the output of the predicted image former 10 is fed to the second input of the subtracter 1 and the second input of the adder 8.

Here will be described the operations. First of all, the video signals are divided into macroblocks or basic processing units, as shown in FIG. 2, and are inputted as external input signals (where the external input signals are basically inputted as the macroblocks, which may be directly inputted or may be converted thereinto by preprocessing unit for generating the macroblocks).

Where the video signals inputted are 4:2:0, 16 pixels×16 lines of a luminance signal (Y) are as large in the screen as 8 pixels×8 lines of two chrominance signals (Cb, Cr). Therefore, six blocks (i.e., four blocks for the luminance signal and two blocks for the chrominance signals) of 8 pixels×8 lines construct one macroblock.

Here, it is premised that the video object plane (VOP: a unit image) to be inputted as an external input has a rectangular shape identical to the frame.

Each block is quantized in the quantizer 3 after subjected to the discrete cosine transform (DCT). The DCT coefficients thus quantized are transformed together with additional informations such as a quantizing parameter into the variable length codes after the coefficients of the individual DC and AC components were predicted in the DC/AC predictor 4.

This is the intra coding (as also called the "in-frame encoding"). The VOP for coding all the macroblocks as intra coding will be called the "I-VOP (Intra-VOP)".

On the other hand, the quantized DCT coefficients are dequantized in the dequantizer 6 and are decoded by the IDCT 7 so that the decoded image is stored in the memory 9. The decoded signal stored in this memory 9 is used at an inter coding (which may be called the "inter-frame encoding").

In the inter coding case, the motion detector 11 detects the motion vectors indicating the motions of the macroblocks which are inputted as the external input signals. This motion vector indicates such a position in the decoded image stored in the memory 9 as takes the minimum difference from the macroblock inputted.

The predicted image former 10 forms a predicted image on the basis of the motion vector which is detected in the motion detector 11.

Subsequently, a differential signal is determined between the macroblock inputted and the predicted image formed in the predicted image former 10 and is subjected to the DCT in the DCT 2 so that it is quantized in the quantizer 3.

The DCT coefficients quantized are converted together with the additional information such as the predicted motion vector and the quantized parameter into the variable length codes. On the other hand, the quantized DCT coefficients are dequantized in the dequantizer 6 and subjected to the IDCT in the IDCT 7. The output of the IDCT 7 is added to the predicted image by the adder 8 so that the sum is stored in the memory 9.

For the inter coding, there are two types of prediction. One type is a forward prediction, which is made in the display order of the images only from the VOP preceding in time, and the other type is a bidirectional prediction, which is made from both the preceding VOP and the succeeding VOP. The VOP to be encoded by the forward prediction is called the "P-VOP (Predictive VOP), and the VOP to be encoded by the bidirectional prediction is called the "B-VOP (Bidirectionally Predictive VOP)".

With reference to FIG. 3, here will be described the construction of the bitstream to be outputted from the variable length coder 5. The bitstream of 1 VOP is constructed of one or more video packets, as shown in FIG. 3a.

Here, one video packet is composed of encoding data of one or more macroblocks, and the first video packet of the VOP is assigned the VOP header to its head and stuffing bits for byte alignment to its tail (as shown in FIG. 3b).

The second and subsequent video packets are assigned a Resync Marker for detecting the leading video packet and the video packet header to its head and the stuffing bits to its tail (as shown in FIG. 3c).

Here, the stuffing bits are added at the unit of 1 to 8 bits to the terminal end (cut) of the video packet for adjusting the byte alignment, and is discriminated in its meaning from the stuffing data, as will be described in the following.

On the other hand, the stuffing data can be introduced in an arbitrary number into the video packet, as shown in FIG. 3d. In the case of MPEG4 Video, for example, the stuffing data is called the "stuffing macroblock", which can be introduced like the macroblock into an arbitrary video packet. This stuffing data is abandoned (not substantially used) on the side of the decoding system.

The stuffing data, as defined herein, is used as words of 9 bits or 10 bits for increasing the number of bits but independently of the byte alignment (for adjusting the terminal end of the video packet, for example) and is used between the macroblocks so that its meaning is discriminated from the aforementioned stuffing bits.

The number of macroblocks to be inserted into one video packet is arbitrary but may be generally so constructed, if an error propagation is considered, that each video packet may have a substantially constant number of bits. Where the number of bits in the video packet is thus substantially constant, the area to be occupied by each video packet in one VOP is not constant, as shown in FIG. 4.

With reference to FIG. 5, here will be detailed the operations of the DC/AC predictor 4 (i.e., on the luminance signal Y-component of the macroblock).

As described above, the DC/AC predictor 4 predicts the coefficients of the DC component and the AC components of the quantized DCT coefficients which are outputted from the quantizer 3 in the intra coding case. In the inter coding case, the DC component and the AC components are not predicted, but the quantized DCT coefficients, as outputted from the quantizer 3, are outputted as they are to the variable length coder 5. In this case, the luminance signal Y and the chrominance signals Cb, Cr are separately subjected to the DC/AC prediction.

Here will be described the predictions of the DC component and the AC components of the intra coding case.

If the quantized DCT coefficients of the block being coded are designated by Fx (i, j) ($0 \leq i \leq 7$ and $0 \leq j \leq 7$), if the quantized DCT coefficients of the lefthand adjacent block are designated by Fa (i, j) ($0 \leq i \leq 7$ and $0 \leq j \leq 7$), if the quantized DCT coefficients of the upper adjacent block are designated by Fc (i, j) ($0 \leq i \leq 7$ and $0 \leq j \leq 7$), and if the quantized DCT coefficients of the lefthand upper block are designated by Fb (i, j) ($0 \leq i \leq 7$ and $0 \leq j \leq 7$), the prediction direction is determined at first from the quantized DC component Fb (0, 0) of the lefthand upper block, the quantized DC component Fa (0, 0) of the lefthand adjacent block and the DC component Fc (0, 0) of the upper adjacent block.

If the quantization step size of the DC component of the lefthand adjacent block is designated by Qda, if the quantization step size of the DC component of the lefthand upper block is designated by Qdb and if the quantization step size of the DC component of the upper adjacent block is designated by Qdc, for example, the dequantized DC components fa (0, 0), fb (0, 0) and fc (0, 0) are determined by the following relations:

$fa(0, 0) = Fa(0, 0) \times Qda;$ $fb(0, 0) = Fb(0, 0) \times Qdb;$ and $fc(0, 0) = Fc(0, 0) \times Qdc.$ If the following relation holds, it is conceived that the correlations are intense in the vertical direction, so that the predictions are made from the dequantized DC components fc (0, 0) of the upper adjacent block:

$|fa(0,0) - fb(0, 0)| < |fb(0, 0) - fc(0, 0)|.$

If the aforementioned relation does not hold, it is conceived that the correlations are intense in the horizontal direction, so that the predictions are made from the dequantized DC components fa (0, 0) of the lefthand adjacent block.

In the case of predicting the DC components from the upper adjacent block, the predicted DC component Px (0, 0) is determined by setting the following relation:

$Px(0, 0) = Fx(0, 0) - fc(0, 0)/Qdx.$

In the case of predicting the DC components from the lefthand adjacent block, the predicted DC component Px (0, 0) is determined by setting the following relation:

$Px(0, 0) = Fx(0, 0) - fa(0, 0)/Qdx.$

Here, Qdx is the quantization step size of the DC component of the current block, and the aforementioned divisions are calculated by the rounding method, for example.

Subsequently, the AC components are predicted by using the prediction direction of the DC components. In the following, Qpa denotes the quantization parameter of the lefthand adjacent block, Qpc denotes the quantization parameter of the upper adjacent block and Qpx denotes the quantization parameter of the current block. If the DC component is predicted from the upper adjacent block, the first row of the quantized AC components are predicted as follows:

$Px(i, 0) = Fx(i, 0) - (Fc(i, 0) \times Qpc)/Qpx (i=1 \text{ to } 7).$

On the other hand, if the DC component is predicted from the lefthand adjacent block, the first column of the quantized AC components are predicted as follows:

$Px(0, j) = Fx(0, j) - (Fa(0, j) \times Qpa)/Qpx (j=1 \text{ to } 7).$

Thus, the predicted AC components Px (i, 0) or Px (0, j) are determined. The aforementioned divisions are calculated by the rounding method, for example.

After the aforementioned predictions of the AC components were independently made for the six blocks composing one macroblock, it is determined as follows on a macroblock basis whether or not the AC components are to be predicted.

Here, an AC prediction decision index SB of the block is determined in the following manner as the index for deciding whether the original video signals are left as they are (without the prediction of the AC component) or predicted. Where the prediction is made from the upper adjacent block, the AC prediction decision index SB is determined from the following formula:

$SB = \Sigma |Fx(i, 0)| - \Sigma |Px(i, 0)| \ (i=1 \text{ to } 7),$ [Formula 1]

Where the prediction is made from the lefthand adjacent block, the AC prediction decision index SB is determined from the following Formula:

$SB = \Sigma |Fx(0, j)| - \Sigma |Px(0, j)| \ (j=1 \text{ to } 7),$ [Formula 2]

After calculating the AC prediction decision indexes for all blocks in the current macroblock, the sum of these indexes is calculated, that is $SBS = \Sigma SB$. If the sum SBS is in the following relation, the AC components are predicted, but otherwise not predicted:

$SBS \geq 0.$

Here in the case of predicting the AC components, ac_pred_flag=1, but otherwise, ac_pred_flag=0. With this additional information ac_pred_flag, each macroblock is encoded by the variable length coder 5.

In the case of the macroblock of ac_pred_flag=1, for each block predicted from the upper adjacent block, the value Ox (i, j) is determined from the following relations:

$$Ox(i, j) = \begin{cases} Px(i, 0) & (i = 0 \text{ to } 7, j = 0) \\ Fx(i, j) & (i = 0 \text{ to } 7, j = 1 \text{ to } 7). \end{cases} \quad \text{[Formula 3]}$$

For each block predicted from the lefthand adjacent block, the value Ox (i, j) is determined from the following relations:

$$Ox(i, j) = \begin{cases} Px(0, j) & (i = 0, j = 0 \text{ to } 7) \\ Fx(i, j) & (i = 1 \text{ to } 7, j = 0 \text{ to } 7). \end{cases} \quad \text{[Formula 4]}$$

For the block belonging to the macroblock of ac_pred_flag=0, the value Ox (i, j) is determined from the following relations:

$$Ox(i, j) = \begin{cases} Px(0, 0) & ((i, j) = (0, 0)) \\ Fx(i, j) & (i = 0 \text{ to } 7, j = 0 \text{ to } 7 \\ & (i, j) \neq (0, 0)). \end{cases} \quad \text{[Formula 5]}$$

This value Ox (i, j) is outputted as the output of the DC/AC predictor 4 to the variable length coder 5.

In the predictions thus far described, where the current block is on the left end of the VOP, there is neither the lefthand adjacent block nor the lefthand upper block for the current block. Therefore, a predetermined constant β is used as the values of the dequantized DC components fa (0, 0) and fb (0, 0) to be used in the aforementioned predictions. In this case, the AC components Fa (i, j) and Fb (i, j) ((i, j)≠(0, 0)) to be used in the aforementioned predictions are set to 0.

The constant β is an intermediate value of the range of the value of the DC component of the DCT coefficients to be outputted from the DCT 2. Specifically, β=1,024 where the DC component to be outputted from the DCT 2 is 11 bits and takes a value from 0 to 2,047.

Similarly, where the current block is on the upper end of the VOP, there is neither the upper adjacent block nor the lefthand upper block for the current block. Therefore, the aforementioned constant β is used as the values of the dequantized DC components fc (0, 0) and fb (0, 0) to be used in the aforementioned predictions, and the AC components Fc (i, j) and Fb (i, j) ((i, j)≠(0, 0)) are set to 0.

In the aforementioned predictions, moreover, where the block lefthand adjacent to the current block belongs to a video packet different from that of the current block, the dequantized DC component fa (0, 0) to be used in the aforementioned predictions is assumed to take a value of the aforementioned constant β, and the AC components Fa (i, j) ((i, j)≠(0, 0)) are 0.

In the aforementioned predictions, likewise, where the block upper adjacent to the current block belongs to a video packet different from that of the current block, the dequantized DC component fc (0, 0) to be used in the aforementioned predictions is assumed to take a value of the aforementioned constant β, and the AC components Fc (i, j) ((i, j)≠(0, 0)) are 0.

In the aforementioned predictions, on the other hand, where the block lefthand upper to the current block belongs to a video packet different from that of the current block, the dequantized DC component fb (0, 0) to be used in the aforementioned predictions is assumed to take a value of the aforementioned constant β, and the AC components Fb (i, j) ((i, j)≠(0, 0)) are 0.

Thus, the DC/AC predictor 4 is so constructed by not referring the DC component and the AC components between the blocks belonging to the different video packets that the propagation of a transmission error in the DC/AC predictions may be confined in the video packet.

The encoding system of the background art thus far described has not sufficiently considered the processing for avoiding the overflow of the transmission buffer or the underflow of the VBV buffer or a virtual buffer on the receiver side.

Moreover, the number of bits for a macroblock is usually increased/decreased by adjusting the quantization parameters to be used in the quantizer 3, but there is no explicit way for processing the case in which overflow of the transmission buffer occurs even with the maximum quantization parameter (while supressing the number of bits with most coarse quantization).

Processing time for encoding a VOP is also an issue. Where the rate of the VOP to be inputted is F (1/sec.), it is requested that all the macroblocks composing one VOP be encoded for a time period of 1/F (sec.) or shorter.

Where the motion detector 11 is so constructed as to change the search range of the motion vector adaptively in response to the motion of the object in the VOP, however, the time period necessary for the motion detector 11 to detect the motion vector of each macroblock changes for the individual macroblocks so that the time period for processing one VOP is not constant. Therefore, new control is necessary for encoding all the macroblocks in a VOP within a predetermined time period.

SUMMARY OF THE INVENTION

An object of this invention is to provide an encoding method for avoiding the overflow of a transmission buffer and the underflow of a VBV buffer effectively.

This invention also contemplates to propose an encoding system and an encoding method for ending the encoding of one VOP within a predetermined time period even where the time period necessary for encoding one macroblock is not constant.

BRIEF DESCRIPTION OF THE DRAWINGS

FIGS. 3a to 3d are explanatory diagrams showing structure of bitstreams in the encoding system of the background art;

DETAILED DESCRIPTION OF THE PREFERRED EMBODIMENTS

This invention will be specifically described in its embodiments with reference to the accompanying drawings.

Embodiment 1

Figure 6:
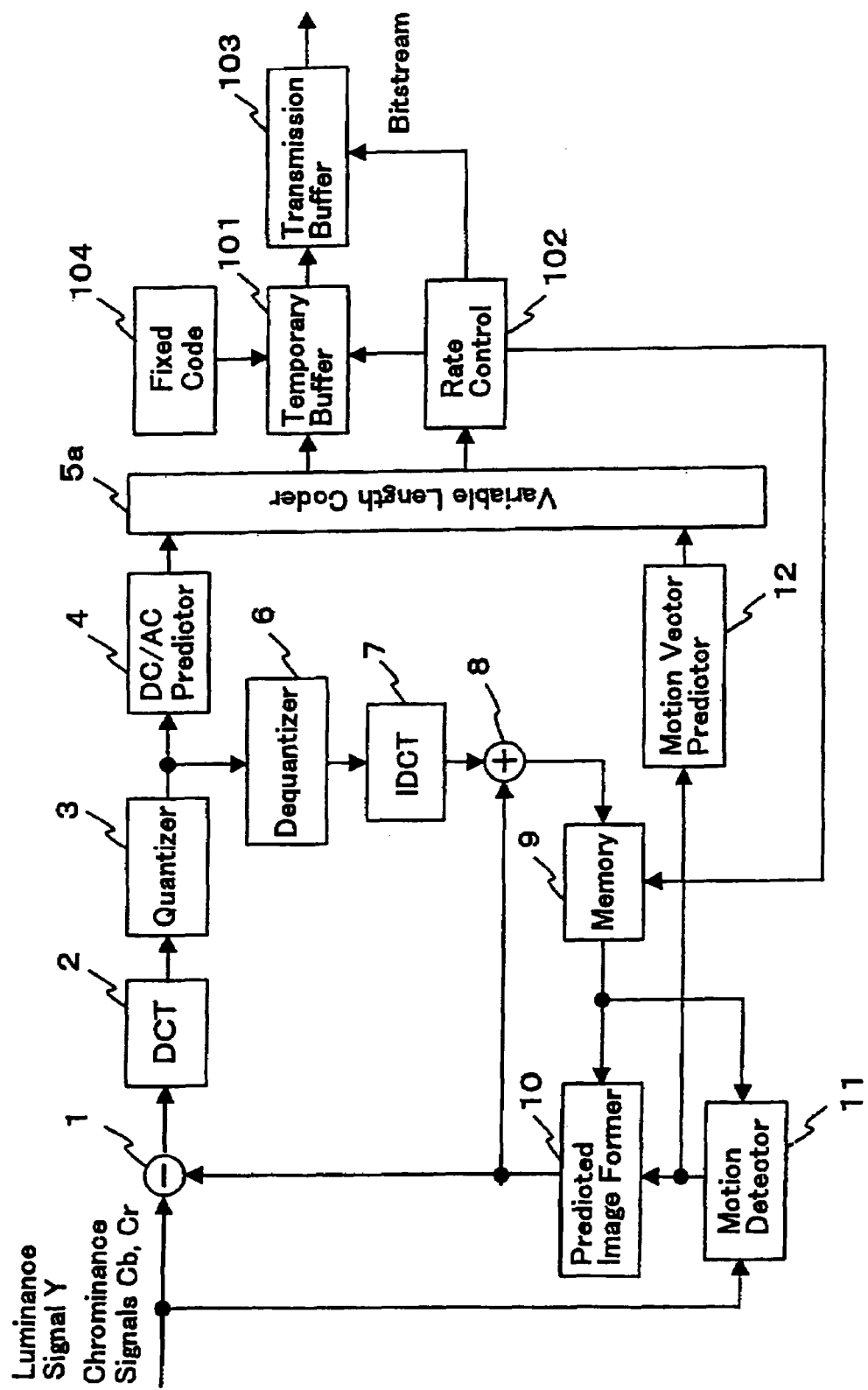
FIG. 6 is a block diagram showing Embodiment 1 of the invention.

FIG. 6 shows an encoding system according to Embodiment 1 of this invention. In FIG. 6, reference numeral 1 designates a subtracter for receiving an external input signal as its first input. The output of the subtracter 1 is inputted through DCT 2 and quantizer 3 to a DC/AC predictor 4 and dequantizer 6. The output of the DC/AC predictor 4 is fed to the first input of variable length coder 5a.

On the other hand, the output of the dequantizer 6 is fed through IDCT 7 to the first input of an adder 8. The output of this adder 8 is fed to a first input of a memory 9, the output of which is fed to the first input of predicted image former 10 and the first input of a motion detector 11.

An external input signal is fed to the second input of the motion detector 11, the output of which is fed to the second input of the predicted image former 10 and a motion vector predictor 12. The output of the predicted image former 10 is fed to the second input of the subtracter 1 and the second input of the adder 8.

The output of the motion vector predictor 12 is fed to the second input of variable length coder 5a. Here, the encoding unit is constructed from the aforementioned components, from the subtracter 1 for receiving the external input signal to the variable length coder 5a for outputting the variable length code corresponding to the external input signal (Of course, the construction disclosed herein is only one example and could be exemplified by the known one capable of encoding the external input signal in a corresponding manner).

The first output of the variable length coder 5a is fed to the first input of a temporary buffer 101, and the second output of the variable length coder 5a is fed to rate control unit 102.

The temporary buffer 101 is fed at its second input with the output of fixed code output unit 104 and at its third input with the first output of the rate control unit 102. The output of the temporary buffer 101 is fed to the first input of a transmission buffer 103 (Here, the temporary buffer 101 or the transmission buffer 103 corresponds to storage unit.).

The second output of the rate control unit 102 is fed to the second input of the memory 9, and the third output of the rate control unit 102 is fed to the second input of the transmission buffer 103. The output of the transmission buffer 103 is outputted (transmitted) as the bitstream.

The bitstream outputted (transmitted) is received and decoded on the side of the decoding system.

Here will be described the operations.

Figure 1:
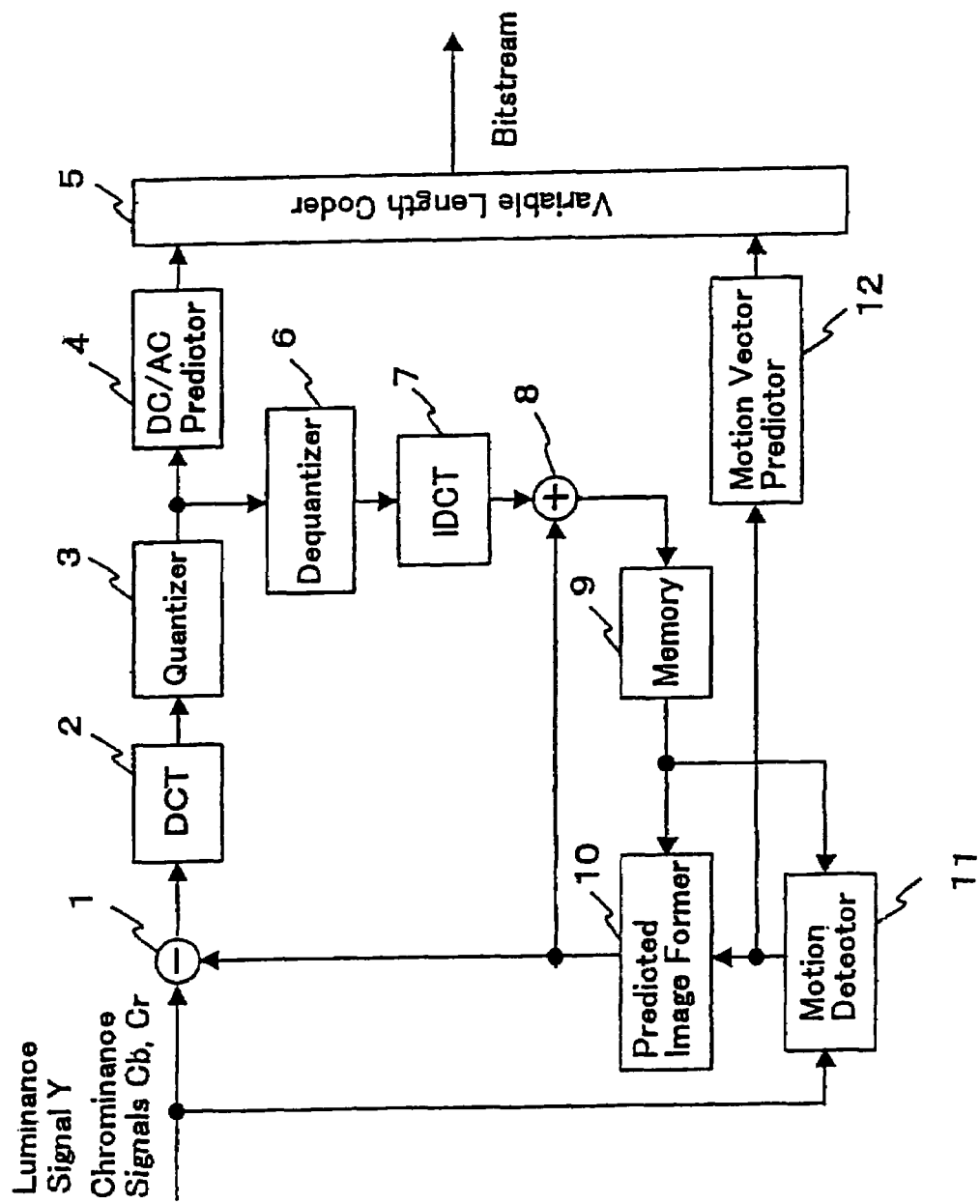
FIG. 1 is a block diagram showing an encoding system of the background art.
Figure 2:
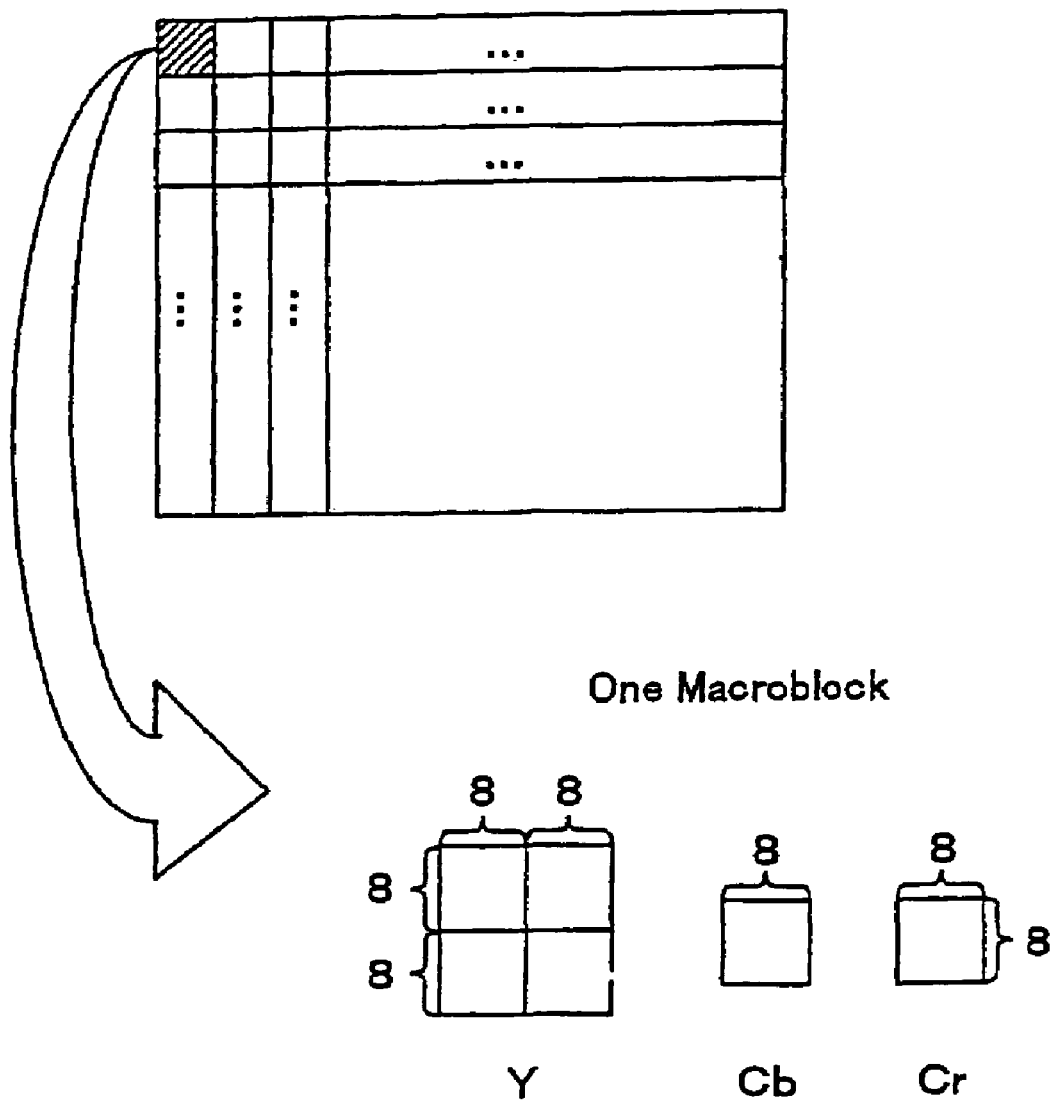
FIG. 2 is an explanatory diagram showing an input signal to the encoding system of the background art.
Figure 4:
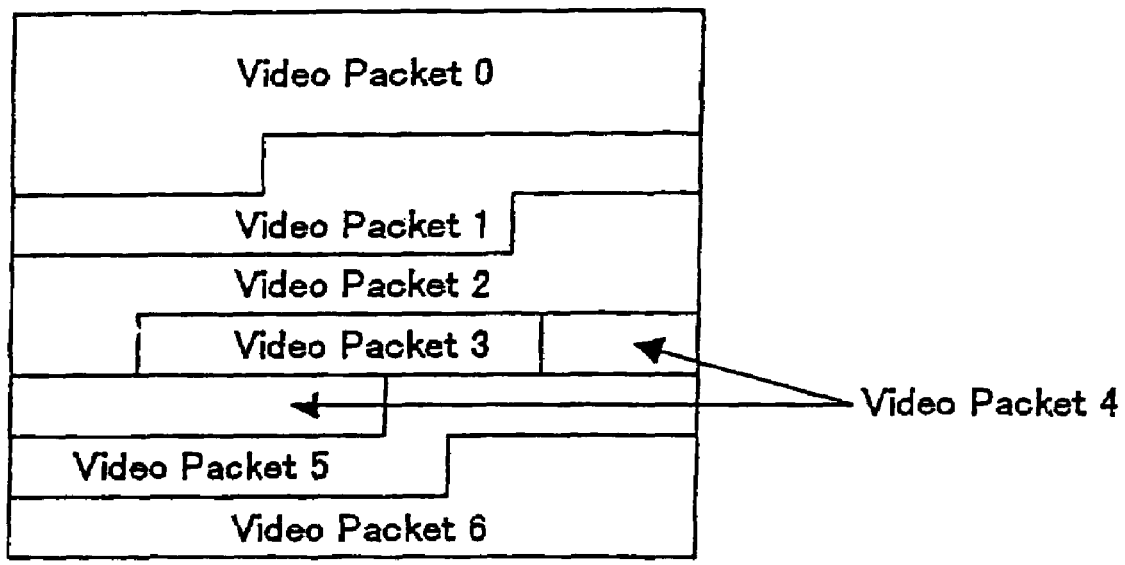
FIG. 4 is an explanatory diagram showing the position of video packets on the screen in the encoding system of the background art.
Figure 5:
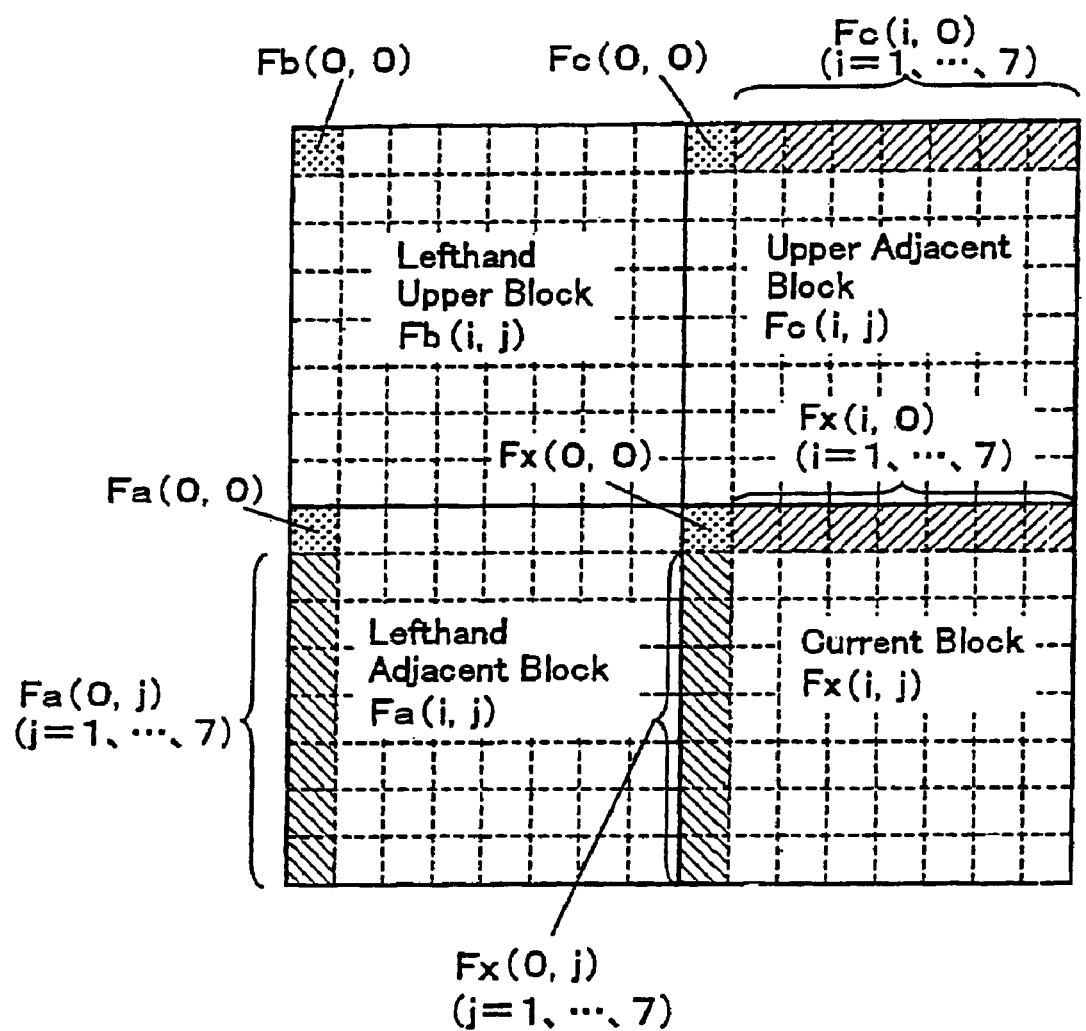
FIG. 5 is an explanatory diagram showing a DC/AC prediction in the encoding system of the background art.

First of all, the video signals are divided into macroblocks or basic processing units, as shown in FIG. 2, and are inputted as input macroblocks to the subtracter 1 and the motion detector 11. Where the video signals inputted are 4:2:0, for example, 16 pixels×16 lines of a luminance signal (Y) are as large in the screen as 8 pixels×8 lines of two chrominance signals (Cb, Cr), so that six blocks of 8 pixels×8 lines construct one macroblock.

In the intra coding case, each block is subjected to the DCT and then quantized. This quantized DCT coefficients are predicted in the DC/AC predictor 4 and is then encoded together with the additional information such as the quantization parameter. The quantized DCT coefficients are dequantized by the dequantizer 6 and subjected to the IDCT and decoded. The output of the IDCT 7, i.e., the decoded image is stored in the memory 9.

In the inter coding case, the motion detector 11 detects the motion vector indicating the motions of the inputted macroblocks. This motion vector indicates such a position in the decoded image stored in the memory 9 as takes the minimum difference from the input macroblock.

The predicted image former 10 forms a predicted image on the basis of the motion vector which is detected in the motion detector 11. Next, a difference is determined between the input macroblock and the predicted image and is subjected to the DCT by the DCT 2 and quantized by the quantizer 3.

The quantized DCT coefficients are encoded together with the additional information such as the motion vector predicted by the motion vector predictor 12 and the quantization parameter, by the variable length coder 5a. On the other hand, the quantized DCT coefficients are dequantized in the dequantizer 6. And the output of the dequantizer 6 is subjected to the IDCT in the IDCT 7. And the output of the IDCT 7 is added to the predicted image outputted by the predicted image former 10 so that the sum is stored in the memory 9.

Here will be specifically described the operations of the variable length coder 5a.

For each macroblock, the variable length coder 5a encodes the quantized DCT coefficients and additional information, stores them in the temporary buffer 101, and outputs the number of bits used for the current macroblock to the rate control unit 102.

In the case of the I-VOP of MPEG4, for example, the AC components of the DCT coefficients in each block, as outputted from the DC/AC predictor 4, is one-dimensionally scanned at first by the zigzag scanning method or the like to perform the run-length encoding of the combination between the number of zero and the coefficient of non-zero. The coded data of AC components in each block are stored in the temporary buffer 101.

Figure 7:
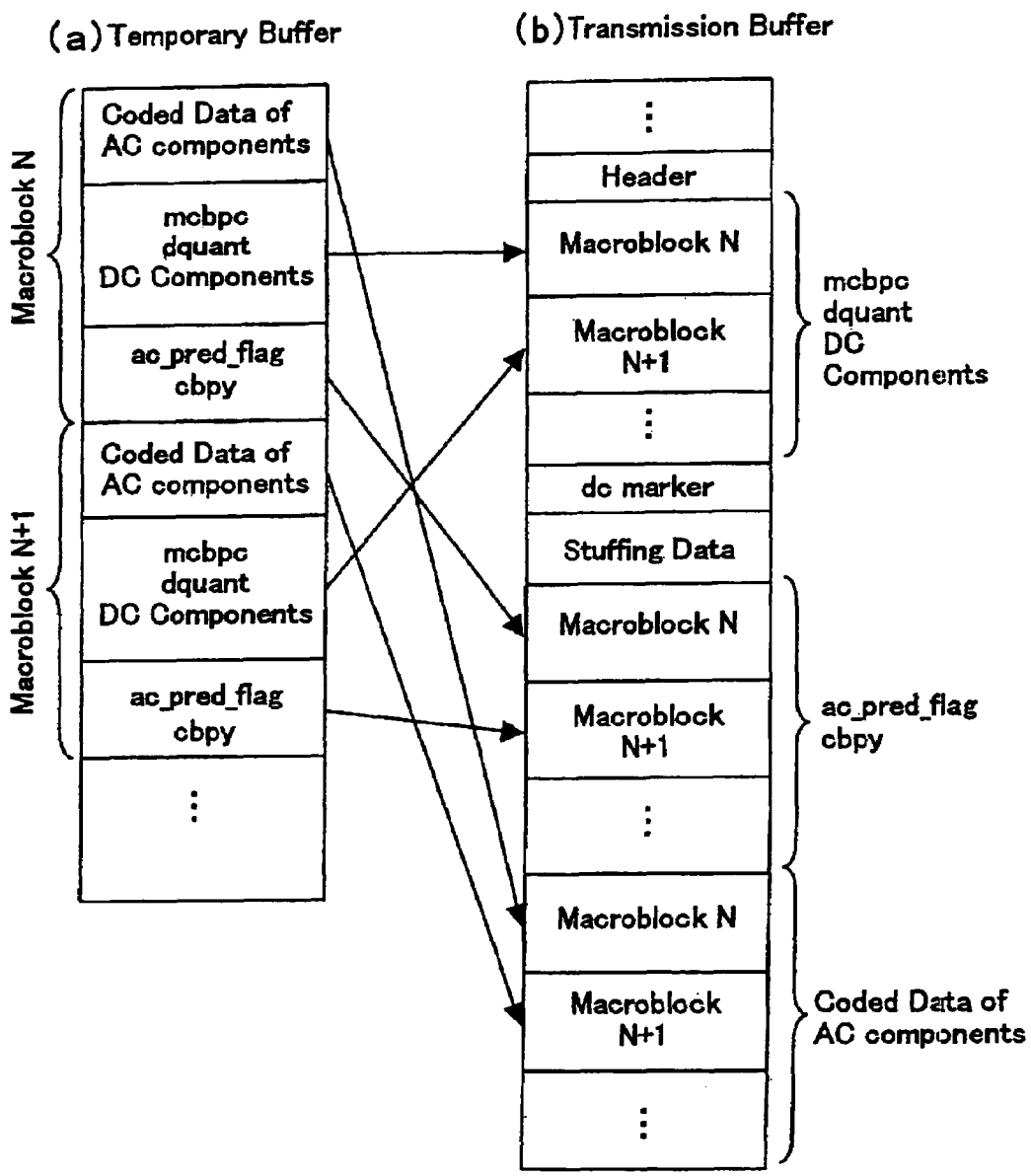
FIGS. 7a and 7b are explanatory diagrams showing the states (for the case of an I-VOP) of a temporary buffer and a transmission buffer in Embodiment 1 of the invention.

After the coefficient data of each block, as shown in FIG. 7a, there are sequentially encoded and stored in the temporary buffer 101: mcbpc which is the code for MTYPE (macroblock type such as intra/inter mode) and cbpc indicating whether or not each block of the chrominance signal has the non-zero AC components; dquant indicating the quantization parameter; the DC components of the DCT coefficients in each block; ac_pred_flag indicating whether or not the AC prediction has been made; and cbpy indicating whether or not each block of Y has the non-zero AC coefficients.

Here, the number of bits for each macroblock is outputted to the rate control unit 102.

Figure 8:
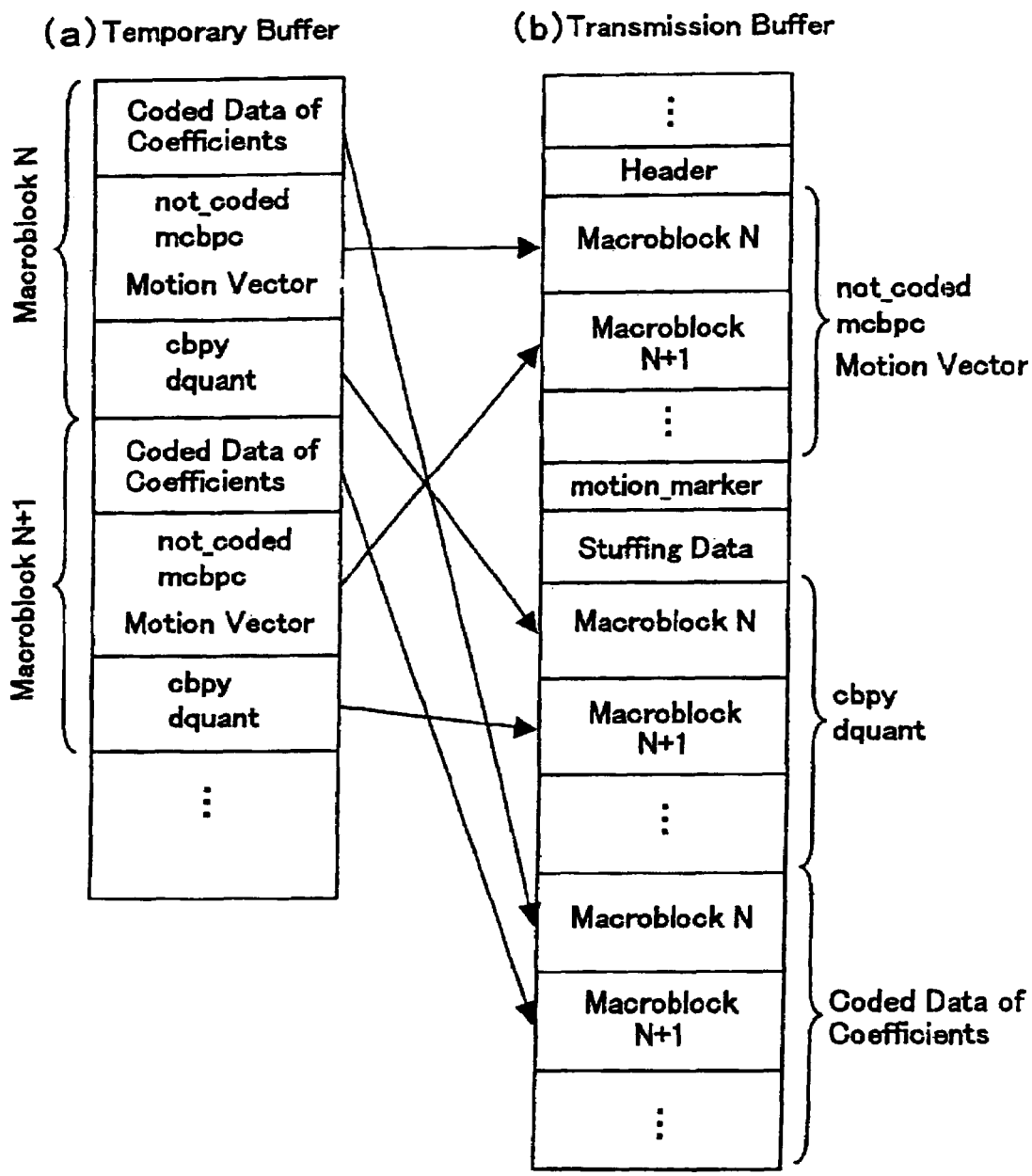
FIGS. 8a and 8b are explanatory diagrams showing the states (for the case of a P-VOP) of the temporary buffer and the transmission buffer in Embodiment 1 of the invention.

Similarly, in the case of P-VOP of MPEG4, the encoded data, ordered as shown in FIG. 8a, are stored in the temporary buffer 101.

On the basis of the number of bits in each macroblock outputted from the variable length coder 5a, the rate control unit 102 arranges the macroblocks so that the length of each video packet may not exceed a predetermined value, and transfers the arranged macroblocks from the temporary buffer 101 to the transmission buffer 103.

In the case of MPEG4, for example, the header is added to the head of each video packet, which is rearranged in the order of the specified bitstream and is transferred, as shown in FIGS. 7b and 8b.

On the other hand, the rate control unit 102 sets the maximum number of bits Tmax for each VOP so that the transmission buffer 103 may not overflow or so that the VBV (Video Buffering Verifier) buffer may not underflow. (The VBV buffer is a buffer model of a decoder. It is required in order to bound memory requirements for the bitstream buffer needed by a decoder.)

The rate control unit 102 selects output of the variable length coder 5a or the output of the fixed code output unit 104 so that the number of bits for the current VOP may not be greater than value Tmax and stores it in the temporary buffer 101.

Here, Tmax is the upper limit of the number of bits for the VOP to prevent the transmission buffer 103 from overflowing and the VBV buffer from underflowing.

Here will be detailed the operations.

The rate control unit 102 determines the maximum number of bits Tmax for each VOP before encoding it. For example, if the transmission buffer 103 has a capacity Bs (bits), and if the current occupancy of the transmission buffer 103 is B (bits), it is sufficient for preventing the transmission buffer 103 from overflowing that the number of bits for the VOP is Bs−B or less. It is, therefore, sufficient that Tmax is set as follow:

$Tmax \leq Bs-B.$

In the case of administrating the VBV buffer, the number of bits to be received for one VOP period by VBV buffer is Rp:

$Rp=R/F.$

Where R(bits/sec) is the bit rate and F(1/sec) is the VOP rate(frame rate).

If the occupancy of the VBV buffer at the decoding time of the previous VOP is expressed by vbv_bits (bits), it is sufficient for preventing the VBV buffer from underflowing that the number of bits used for the current VOP does not exceed vbv_bits+Rp. In short, it is sufficient to set Tmax in the following relations:

$Tmax \leq vbv\_bits+Rp.$

Before encoding each VOP, therefore, the rate control unit 102 sets Tmax as follow:

$Tmax=\min(vbv\_bits+Rp, Bs-B).$

Where min(a,b) takes the lesser of the values a and b.

Here, the occupancy vbv_bits of the VBV buffer is the estimated occupancy of the buffer on the decoder side. If the decoder is so configured that the decoding time is to be delayed when its buffer becomes empty, the VBV buffer is allowed to underflow. In such cases, it is unnecessary to check the underflow of the VBV buffer. So Tmax can be set as follow:

$Tmax=Bs-B.$

Since the occupancy B of the transmission buffer 103 changes with time, Tmax also changes with time and is calculated for each VOP.

Next, for every macroblock, the rate control unit 102 calculates the total number of bits used for the current VOP. In accordance with the flow charts shown in FIGS. 9 and 10, the rate control unit 102 selects either the codes outputted from the variable length coder 5a or the fixed codes outputted from the fixed code output unit 104 for the current macroblock, and stores them in the temporary buffer 101.

Figure 9:
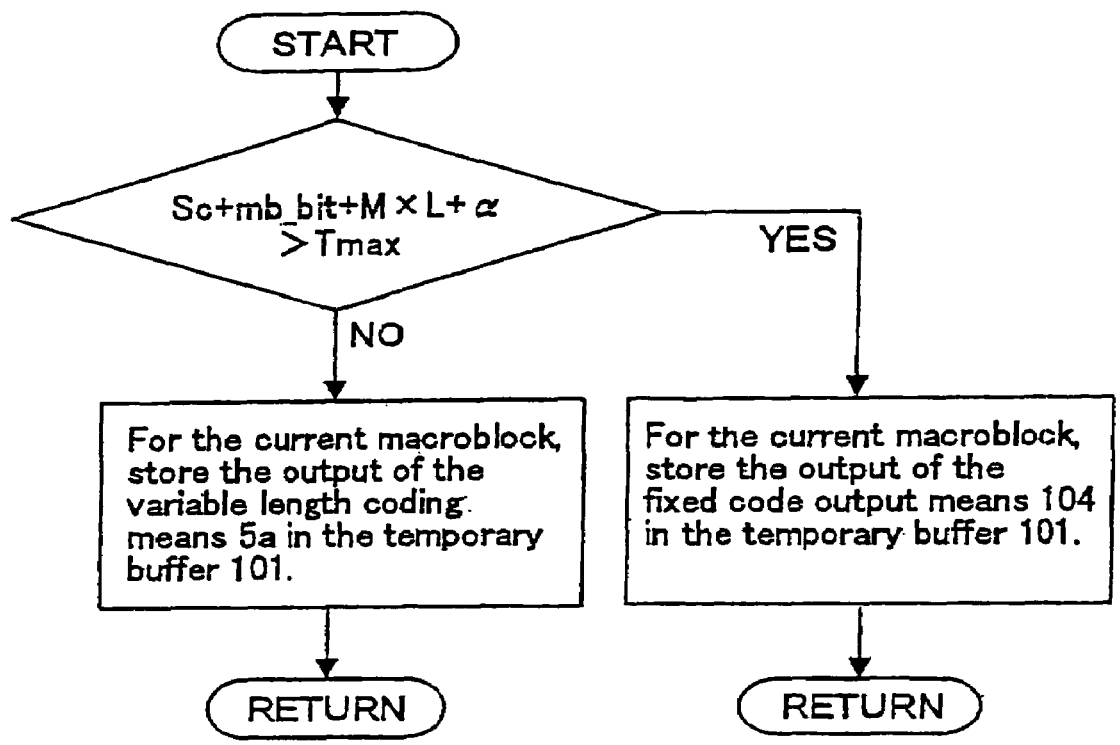
FIG. 9 is a flow chart (for the case of the P-VOP) showing Embodiment 1 of the invention.
Figure 10:
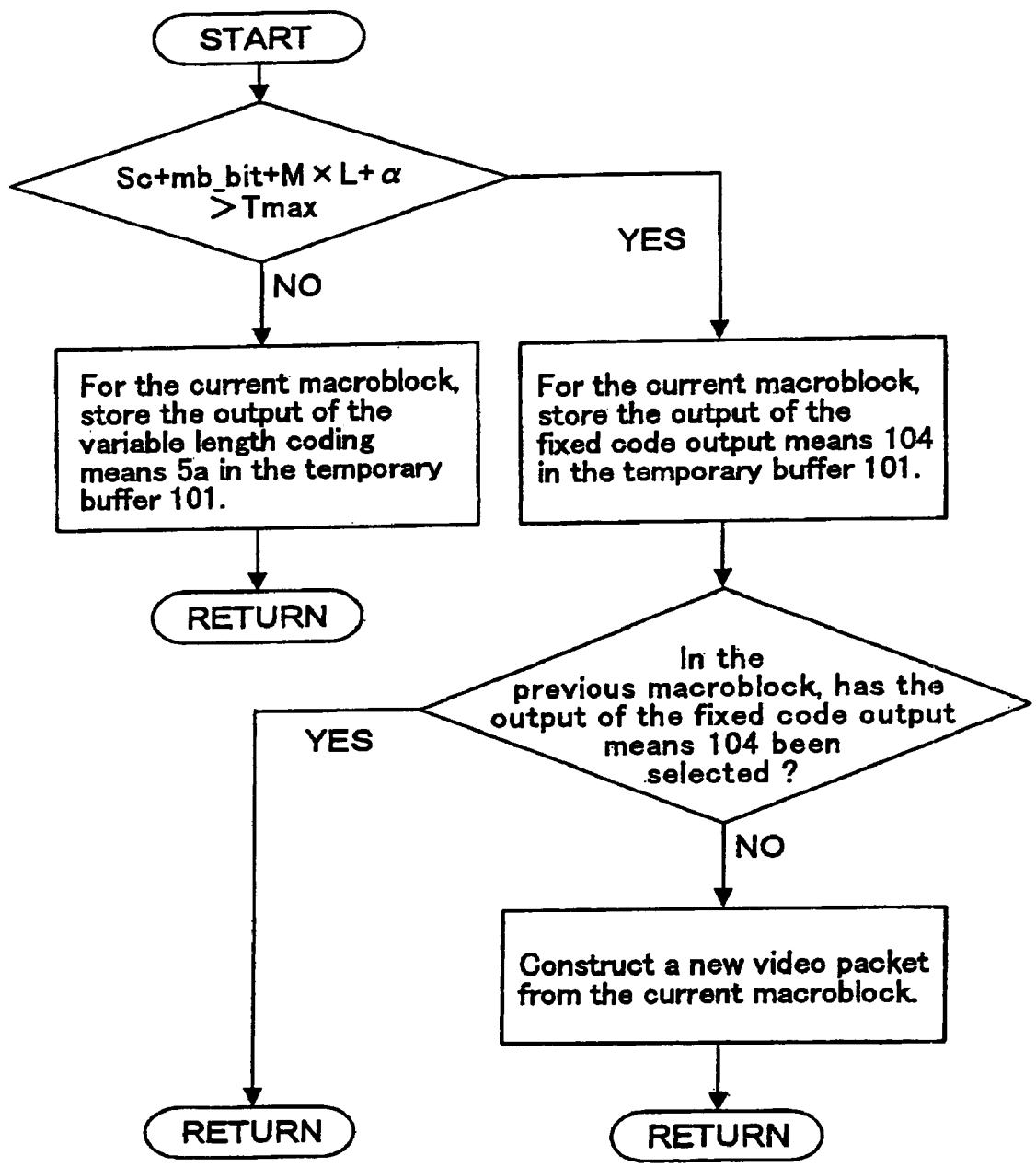
FIG. 10 is a flow chart (for the case of the I-VOP) showing Embodiment 1 of the invention.

Here, FIG. 9 shows a flow chart of the case in which the current VOP is the P-VOP (in which the encoding type is the inter), and FIG. 10 shows a flow chart of the case in which the current VOP is the I-VOP (in which the encoding type is the intra).

(Rate Control for P-VOP)

Here will be described the operations of the rate control unit 102 of the P-VOP case.

In this P-VOP case, the variable length coder 5a outputs the coded data of coefficients, not_coded, mcbpc, the motion vectors, cbpy and dquant, as shown in FIG. 8a, for each macroblock. However, all of these codes are not always present. For example, where all the coefficients are 0 and the motion vector is (0, 0), only 1 bit for not_coded=1 is present. This is the case of the minimum code length for the macroblock in P-VOP.

In P-VOP case, therefore, the fixed code output unit 104 outputs only 1 bit of not_coded=1 as the fixed code. In short, the fixed code output unit 104 outputs the fixed code of the macroblock having the minimum code length for the encoding type of the current VOP.

For each macroblock, the rate control unit 102 calculates the number of bits used for the current VOP. Then it replaces the codes of the current macroblock by the fixed code outputted from the fixed code output unit 104, when the total number of bits used for all macroblocks in the current VOP will exceed Tmax, even the fixed code is selected for all the remaining macroblocks.

Supposing that the total number of macroblocks in a VOP is designated by A and the current macroblock number is designated by K ($0 \leq K \leq A-1$), the number of remaining macroblocks to be encoded is expressed by:

$M=A-K-1.$

If the fixed code of the fixed code output unit 104 is selected for the remaining M macroblocks, the total number of bits used for the current VOP will be expressed by:

$Sc+mb\_bit+M \times L+\alpha,$ where Sc denotes the number of bits used for the macroblocks with the macroblock number 0 through K−1 in the current VOP, mb_bit denotes the number of bits of the codes outputting by the variable length coder 5a for the current macroblock (No. K), and L denotes the code length of the fixed code, and α denotes the number of bits used for the "additional codes" to be generated in the macroblocks of number K through A−1.

Here, the "additional codes" means the codes generated on the video packet basis, such as Resync Marker, the video packet header, the stuffing bits and motion_marker. And, $\alpha \geq 0$.

Where the following relation holds for the current macroblock (having the macroblock number K):

$$Sc+mb\_bit+M{\times}L+\alpha>T\max,$$

the fixed code outputted by the fixed code output unit 104 is stored in the temporary buffer 101. Otherwise, the code outputted by the variable length coder 5a is stored in the temporary buffer 101 (as shown in FIG. 9).

Here, $\alpha$ is determined in the following manner. The number of bits used for the macroblocks with macroblock number K through A−1 is at least:

$$(M+1){\times}L,$$

and the number of video packets for them can be the following number:

$$(M+1){\times}L/VPlen+1,$$

where VPlen denotes the predetermined video packet length. Therefore, the number of bits for the additional codes will be:

$$\alpha=((M+1){\times}L/VPlen+1){\times}Cp,$$

where Cp denotes the sum of the number of bits for Resync Marker, the video packet header and motion_marker in the P-VOP.

In order to simplify the calculation, using the following relation:

$$M+1{\leq}A,$$

$\alpha$ may be set as a fixed value for P-VOP, as expressed by:

$$\alpha=(A{\times}L/VPlen+1){\times}Cp.$$

If the fixed code is selected and stored in the temporary buffer 101 for the current macroblock, the decoded image of the current macroblock stored in the memory 9 is replaced by the decoded image of the same macroblock in the previous VOP which is also stored in the memory 9, because the current macroblock is forced to be not coded macroblock.

In detail, the decoded image of the macroblock with macroblock number K in the previous VOP is copied to the image data area for the current macroblock with macroblock number R in the current VOP. This operation is executed in the memory 9.

In the case of the P-VOP, the fixed code not_coded=1 is output from the fixed code output unit 104. And the decoded image of the current macroblock can be obtained by copying the decoded image of the same macroblock in the previous VOP.

(Rate Control for I-VOP)

Here will be described the operations of the rate control unit 102 of the I-VOP case.

In this I-VOP case, the variable length coder 5a outputs the coded data of the AC components, mcbpc, dquant, the DC component, ac_pred_flag and cbpy, as shown in FIG. 7a, for each macroblock.

However, all of these codes are not always present. For example, if both of cbpc included in mcbpc and cbpy are 0, coefficients of the coded data are not present. And if macroblock type MTYPE, which is included in mcbpc, doesn't have dquant, this dquant is not present also.

In I-VOP case, therefore, the fixed code output unit 104 outputs the fixed coded data which represents that all of the DC and AC component data are 0, dquant=0 and ac_pred_flag=0. This is the case of the minimum code length for the macroblock in I-VOP, for such as MPEG2 or MPEG4 coding system.

As in case P-VOP case, for each macroblock, the rate control unit 102 calculates the number of bits used for the current VOP. Then it replaces the codes of the current macroblock by the fixed code outputted from the fixed code output unit 104, when the total number of bits used for all macroblocks in the current VOP will exceed Tmax, even the fixed code is selected for all the remaining macroblocks.

The replacement operation control is based on following relation:

$$Sc+mb\_bit+M{\times}L+\alpha>T\max$$

(Note that $M=A-K-1$), where Sc denotes the number of bits used for the macroblocks with the macroblock number 0 through K−1 in the current VOP, mb_bit denotes the number of bits of the codes outputting by the variable length coder 5a for the current macroblock (No. K), and L denotes the code length of the fixed code. As shown in FIG. 10, if the above relation is holds, fixed code output of fixed code output unit 104 is stored in the temporary buffer 101. Otherwise, code output of variable length coder 5a is stored in the temporary buffer 101.

Here, $\alpha$ denotes the number of bits to be generated per video packet for the macroblock with macroblock number K through A−1. And $\alpha$ includes data, such as Resync Marker, the video packet header, the stuffing bits or dc_marker. Note that $\alpha{\geq}0$.

Here, $\alpha$ is determined in the following manner. The number of bits used for the macroblocks with macroblock number K through A−1 is at least:

$$(M+1){\times}L,$$

and the number of video packets for them can be the following number:

$$(M+1){\times}L/VPlen+1,$$

where VPlen denotes the predetermined video packet length.

Therefore, the number of bits for the additional codes will be:

$$\alpha=((M+1){\times}L/VPlen+1){\times}Ci,$$

where Ci denotes the sum of the number of bits for Resync Marker, the video packet header, stuffing bits and dc_marker in the I-VOP. In order to simplify the calculation, using the following relation:

$$M+1{\leq}A,$$

$\alpha$ may be set as a fixed value for I-VOP, as expressed by:

$$\alpha=(A{\times}L/VPlen+1){\times}Ci.$$

If the fixed code is selected and stored in the temporary buffer 101 for the current macroblock, and the code output of variable length coder 5a is selected for the previous macroblock, new video packet is generated from the current macroblock, as shown in FIG. 10.

In I-VOP case, even if ac_pred_flag=0, DC components prediction is executed. Therefore, if the DC components in the temporary buffer 101 are 0, it is not indicated that DC component Fx(0,0) output of the quantizer 3 is 0, but the predicted DC component Ox(0,0) output of the DC/AC predictor 4 is 0.

Therefore, in general, the decoded image from the fixed code is not fixed, even if the fixed code output unit 104 outputs the fixed code to the current macroblock.

However, in practical manner, DC/AC predictor 4 does not refer to coefficients of the DC components between blocks of deferent video packet. But DC/AC predictor 4 refers to a constant β, which is an intermediate value in the range of the values of the DC components. Therefore, when the fixed code is selected and stored in the temporary buffer 101, if new video packet is generated from the current macroblock, as aforementioned, dequantized DC component fx(0,0) is $$fx(0, 0)=β$$

Therefore, if the fixed codes outputted from the fixed code output unit 104 are decoded, each pixel of the image has a constant value γ. Here, γ is an intermediate value in the range of the values of the image signal level. For example, if the range of the image signal level can be expressed by 8 bit, that is 0 through 255, the constant value γ is set at 128.

In this manner, the DC components after the dequantization of each block of the current macroblock(No. K) is equal to constant β. And if the fixed code is selected for a next macroblock(No. K+1), the DC components are equal to constant β, and each pixel of the image has a constant image signal level γ.

If the fixed code is selected and stored in the temporary buffer 101 for the current macroblock, the decoded image of the current macroblock stored in the memory 9 is replaced by the constant image signal level γ. Therefore, the constant image signal level γ is stored in the decoded image area for the current macroblock of the current VOP in memory 9.

As described above, this embodiment 1 enables to prevent the number of bits for each VOP from exceeding the maximum number of bits Tmax by selecting either the codes outputted from the variable length coder 5a or the fixed codes outputted from the fixed code output unit 104 on the basis of the flow charts of FIGS. 9 and 10.

Furthermore, this embodiment 1 enables to get the decoded image corresponding to the fixed code outputted from the fixed code output unit 104 without any new calculation even in I-VOP, because it is determined whether or not the new video packet is to be generated from the current macroblock on the basis of the flow charts of FIG. 10.

Embodiment 2

In the foregoing Embodiment 1, the rate control unit 102 selects the output of the variable length coder 5a or the fixed code output unit 104, on the basis of the flow charts shown in FIGS. 9 and 10.

Figure 11:
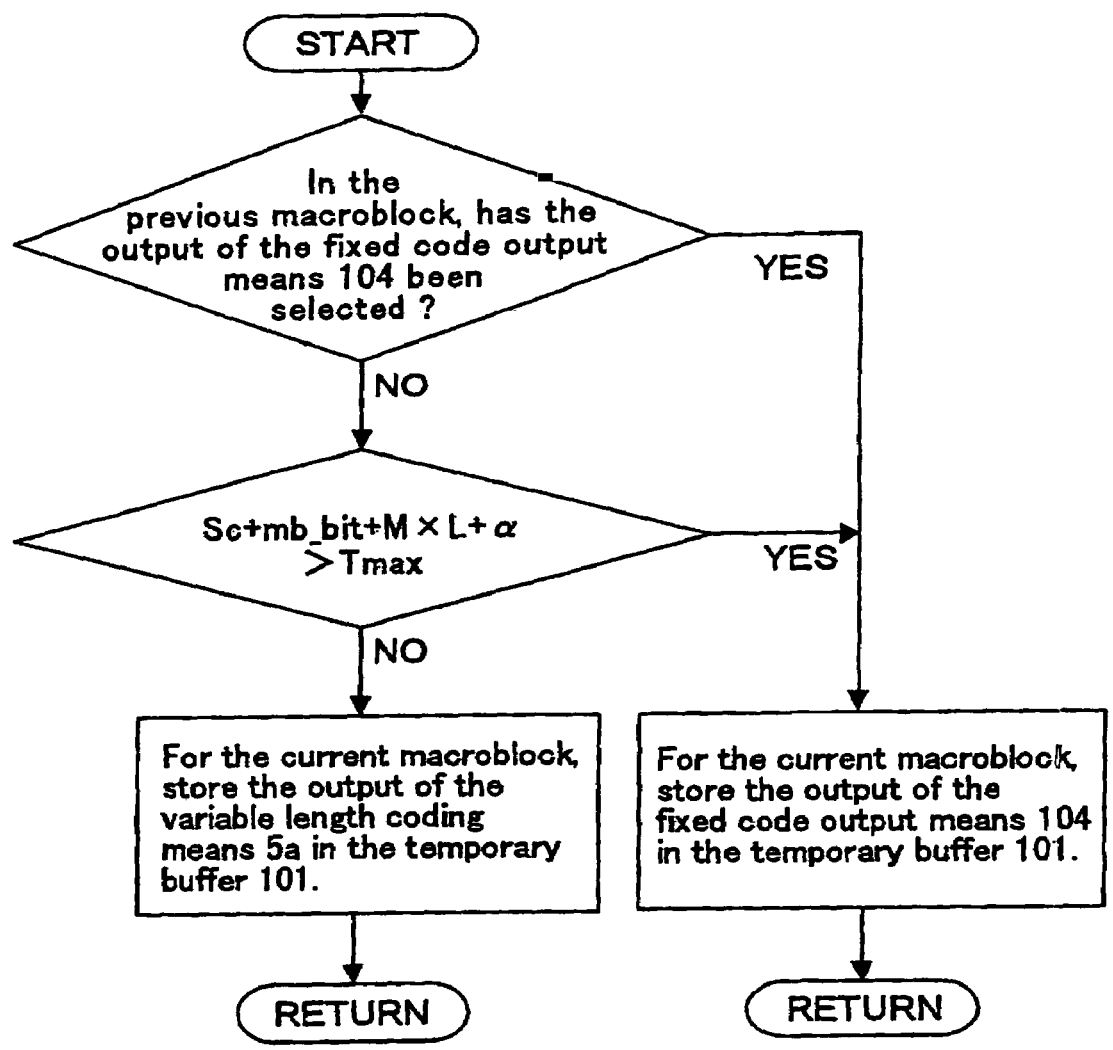
FIG. 11 is a flowchart (for the case of the P-VOP) showing Embodiment 2 of the invention.
Figure 12:
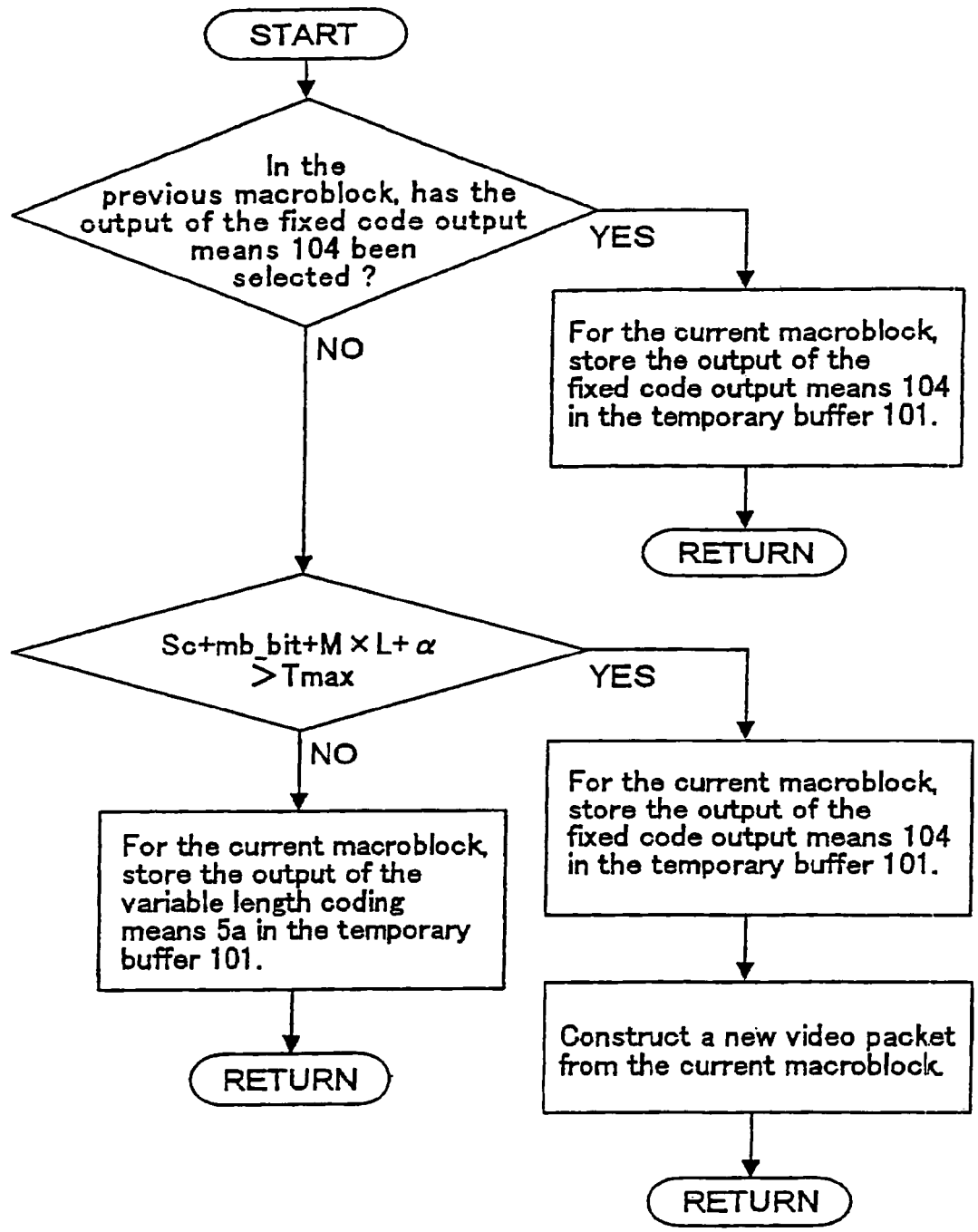
FIG. 12 is a flowchart (for the case of the I-VOP) showing Embodiment 2 of the invention.

On the other hand, in the Embodiment 2, the rate control unit 102 selects the output of the variable length coder 5a or the fixed code output unit 104, on the basis of flow charts shown in FIGS. 11 and 12.

Here, FIG. 11 shows a flow chart of the case that the current VOP is the P-VOP (in which the coding type is the inter). And FIG. 12 shows a flow chart of the case that the current VOP is the I-VOP (in which the coding type is the intra).

(Rate Control for P-VOP)

First of all, the case of P-VOP will be described with reference to FIG. 11.

As Embodiment 1, the rate control unit 102 controls for the current macroblock(No. K) that the fixed code outputted by the fixed code output unit 104 is stored in the temporary buffer 101 when the relation of the total number of bits used for the current VOP and Tmax is as follows:

$$Sc + \text{mb\_bit} + M \times L + α > T\text{max} \qquad (1),$$

where Sc denotes the number of bits used for the macroblocks with the macroblock number 0 through K−1 in the current VOP, mb_bit denotes the number of bits of the codes outputted by the variable length coder 5a for the current macroblock (No. K), M denotes the number of macroblocks at and after macroblock number K+1 of the current VOP, and L denotes the code length of the fixed code.

α denotes the number of bits used for the "additional codes" to be generated in the macroblocks of number K through A−1. Here, the "additional codes" means the codes generated on the video packet basis, such as Resync Marker, the video packet header, the stuffing bits and motion_marker. And, α≧0. As described in Embodiment 1, α either may be calculated for each macroblock or may be fixed for each coding of the VOP.

If aforementioned Relation (1) holds for the current macroblock, it is highly probable that Relation (1) holds for the next macroblock. Because the number of bits are accumulated.

For example, a number of bits Sc' of the macroblock of number 0 through K is the following sum of the code length L of the fixed code, as outputted by the fixed code output unit 104, and the number of bits Sc up to the macroblock number K−1:

$$Sc'=Sc+L.$$

Here, mb_bit is the number of bits of the code outputted by the variable length coder 5a for the macroblock number of K, and mb_bit' is the number of bits of the code outputted by the variable length coder 5a for the macroblock number of K+1. If Relation(1) holds for the macroblock number K, if mb_bit is equal to mb_bit', and if the aforementioned α value is equal for the two macroblocks, the following relations hold:

$$Sc' + \text{mb\_bit}' + (M - 1) \times L + α = Sc + \text{mb\_bit} + M \times L + α$$

$$> T\text{max, and}$$

Relation (1) also holds for the macroblock No. K+1.

Where Relation (1) holds for the macroblock No. K, therefore, the calculations can be omitted while assuming that Relation (1) also holds for the macroblock at and after the macroblock number K.

As shown in FIG. 11, it is judged at first whether or not the fixed code of the fixed code output unit 104 has been selected for the previous macroblock with macroblock number K−1. If the fixed code of the fixed code output unit 104 has been selected for the previous macroblock, the fixed code of the fixed code output unit 104 is stored in the temporary buffer 101, for the current macroblock.

On the other hand, if the fixed code of the fixed code output unit 104 has not been selected for the previous macroblock, the aforementioned Relation (1) is evaluated. If Relation (1) holds, the fixed code of the fixed code output unit 104 is stored in the temporary buffer 101. Otherwise, the output of the variable length coder 5a is stored in the temporary buffer 101.

(Rate Control for I-VOP)

In I-VOP case, as shown in FIG. 12, it is judged at first whether or not the fixed code of the fixed code output unit 104 has been selected for the previous macroblock with macroblock number K−1. If the fixed code has been selected, the fixed code of the fixed code output unit 104 is stored in the temporary buffer 101 for the current macroblock with macroblock number K. In this case, it is unnecessary to generate a new video packet from the current macroblock, as Embodiment 1.

On the other hand, if the fixed code of the fixed code output unit 104 has not been selected for the previous macroblock, the rate control unit 102 judges that the aforementioned Relation (1) is satisfied or not. If Relation (1) holds, the fixed code of the fixed code output unit 104 is stored in the temporary buffer 101, and a new video packet is generated from the current macroblock. Otherwise, the output of the variable length coder 5a is stored in the temporary buffer 101.

Here in Embodiment 2, if Relation (1) holds for a macroblock in one VOP, for at and after the current macroblock, the fixed code of the fixed code output unit 104 is stored in the temporary buffer 101. Therefore, after the current macroblock, no operation is needed for the coding unit which includes the subtracter 1, the DCT 2, the quantizer 3, the DC/AC predictor 4, the variable length coder 5a, the dequantizer 6, the IDCT 7, the adder 8, the predicted image former 10, the motion detector 11 and the motion vector predictor 12.

Therefore, volume of processing and power consumption can be reduced by stopping the operation of the coding unit.

Embodiment 3

Figure 13:
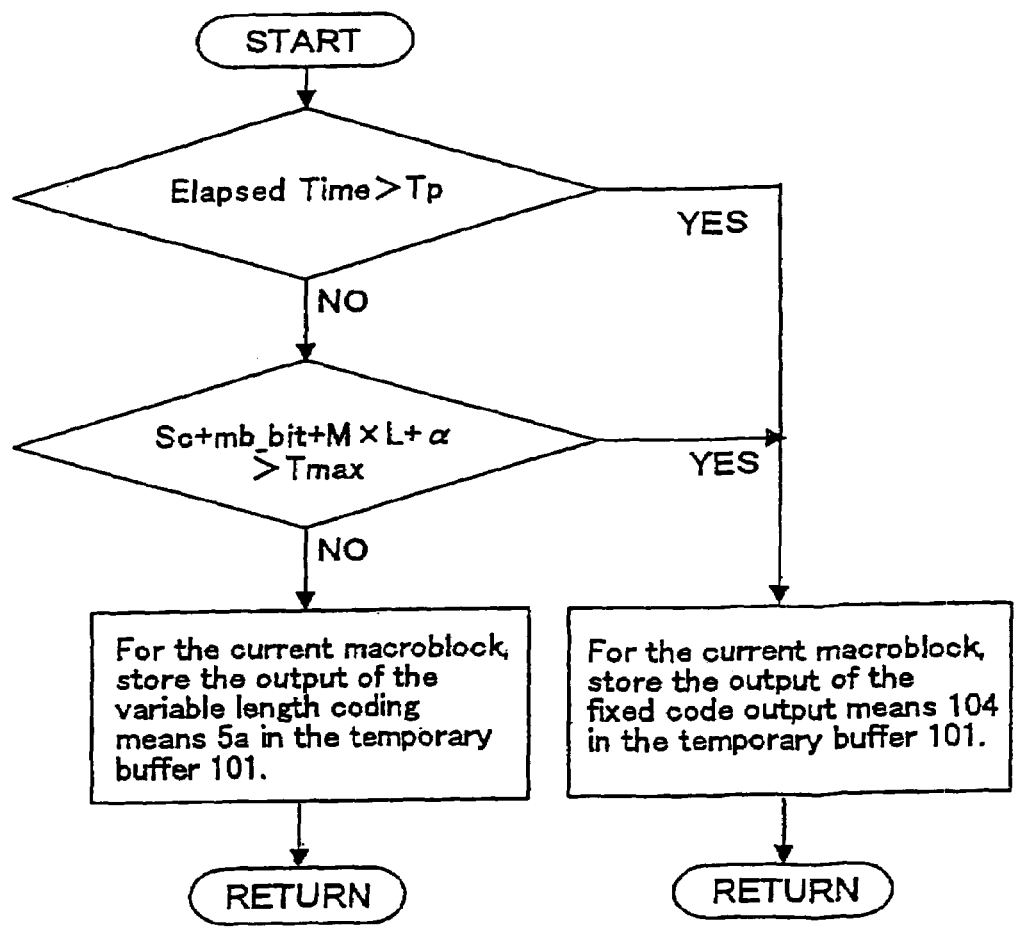
FIG. 13 is a flow chart showing Embodiment 3 of the invention.

In Embodiment 3, the rate control unit 102 selects the output of the variable length coder 5a or the fixed code output unit 104, on the basis of the flow charts shown in FIGS. 13.

Here, FIG. 13 shows a flow chart of the case that the current VOP is the P-VOP (in which the coding type is the inter).

(Rate Control for P-VOP)

For example, if the motion detector 11 operates adaptively to change the search range of the motion vector according to the motion of an object in the VOP, necessary time for the motion detector 11 to detect the motion vector of each macroblock changes every macroblock and the processing time of one VOP is not constant.

Under such conditions, if the processing time, including the necessary time for motion vector detecting, is insufficient for coding all the macroblocks within the predetermined processing time for one VOP, the fixed code of the fixed code output unit 104 is stored in the temporary buffer 101. And the operations of the subtracter 1, the DCT 2, the quantizer 3, the DC/AC predictor 4, the variable length coder 5a, the dequantizer 6, the IDCT 7, the adder 8, the predicted image former 10, the motion detector 11 and the motion vector predictor 12 are not made.

The rate control unit 102 measures the elapsed time from the instant when the leading macroblock (macroblock number 0) constructing the current VOP was inputted. If the elapsed time exceeds a predetermined processing time Tp, the fixed code of the fixed code output unit 104 is always stored in the temporary buffer 101 as shown in FIG. 13. Otherwise, on the basis of the aforementioned Relation (1), the output (the fixed code) of the fixed code output unit 104 and the output of the variable length coder 5a are selected and stored in the temporary buffer 101.

Here, the predetermined processing time Tp of this case is set to one VOP period at the maximum, because the processing for one VOP has to be completed within the VOP period. Therefore, if another processing is incorporated into this VOP period, the difference of one VOP period and the necessary time for another processing is the maximum value for the processing time Tp.

(Rate Control for I-VOP)

Where the current VOP is I-VOP, the rate control unit 102 selects the code to be stored in the temporary buffer 101 in accordance with the flow chart of FIG. 10 or 12, as in Embodiment 1 or Embodiment 2.

Embodiment 4

Figure 14:
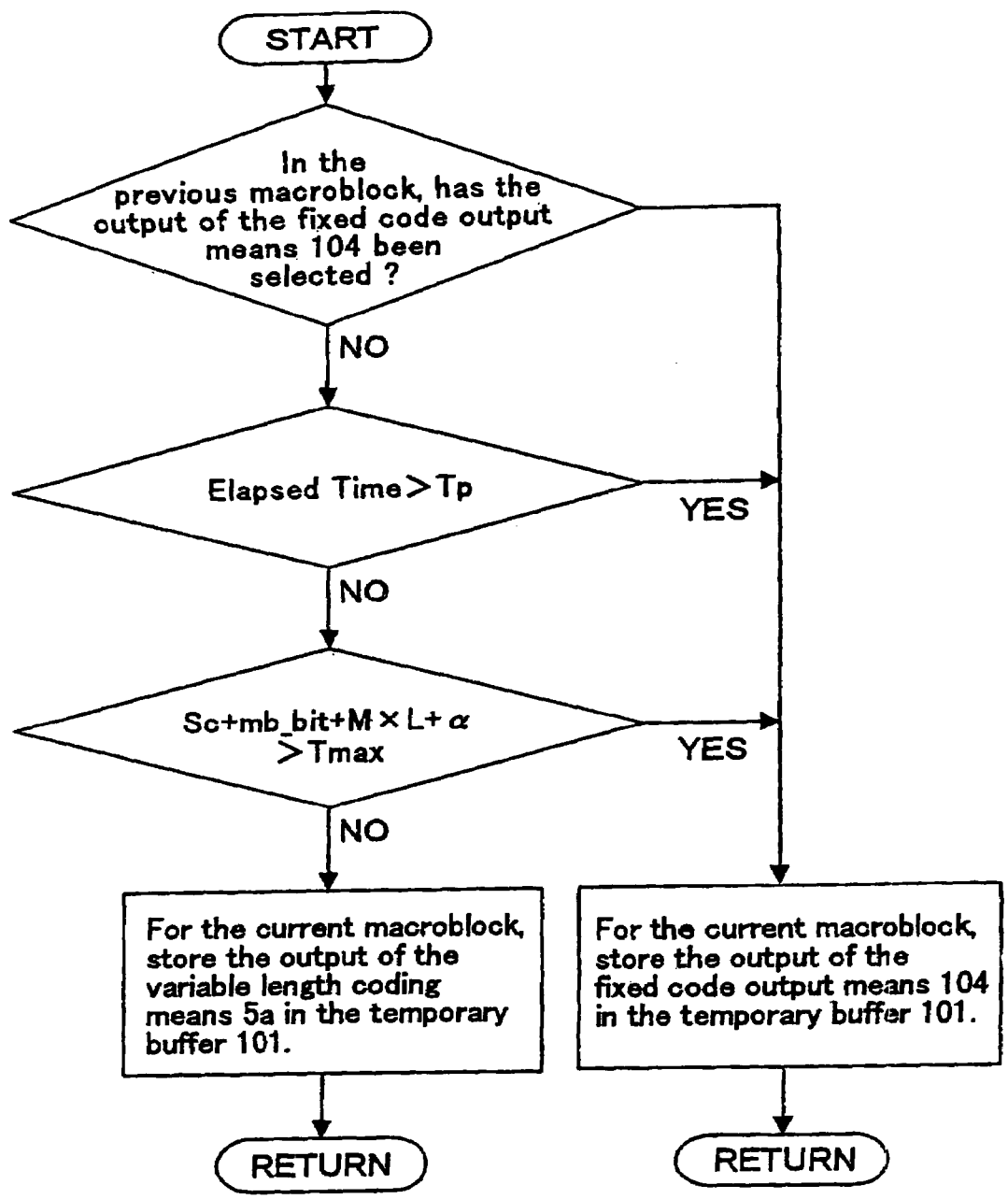
FIG. 14 is a flow chart showing Embodiment 4 of the invention.

In Embodiment 4, the rate control unit 102 selects the output of variable length coder 5a or the fixed code output unit 104, on the basis of the flow charts shown in FIG. 14.

Here, FIG. 14 shows a flow chart of the case that the current VOP is the P-VOP (in which the coding type is the inter).

(Rate Control for P-VOP)

As in embodiment 2, it is judged at first whether or not the fixed code of the fixed code output unit 104 has been selected for the previous macroblock with macroblock number K−1. If the fixed code of the fixed code output unit 104 has been selected for the previous macroblock, the fixed code of the fixed code output unit 104 is stored in the temporary buffer 101, for the current macroblock.

Next, as in embodiment 2, The rate control unit 102 measures the elapsed time from the instant when the leading macroblock (macroblock number 0) constructing the current VOP was inputted. If the elapsed time exceeds a predetermined processing time Tp, the fixed code of the fixed code output unit 104 is always stored in the temporary buffer 101. Otherwise, on the basis of the aforementioned Relation (1), the output (the fixed code) of the fixed code output unit 104 and the output of the variable length coder 5a are selected and stored in the temporary buffer 101.

(Rate Control for I-VOP)

Where the current VOP is I-VOP, the rate control unit 102 selects the code to be stored in the temporary buffer 101 in accordance with the flow chart of FIG. 10 or 12, as in Embodiment 1 or Embodiment 2.

Embodiment 5

The fixed code output unit 104 shown in Embodiment 1, is likely to be independent of the variable length coder 5a. However, if these elements are constructed by the software, the ROM table can be provided for common use for both the fixed code output unit 104 and the variable length coder 5a.

As described in Embodiment 1, the fixed code of the fixed code output unit 104 is one of the I-VOP/P-VOP macroblock codes. Therefore, the ROM table for common use can be realized by integrating the fixed code output unit 104 and the variable length coder 5a.

Figure 15:
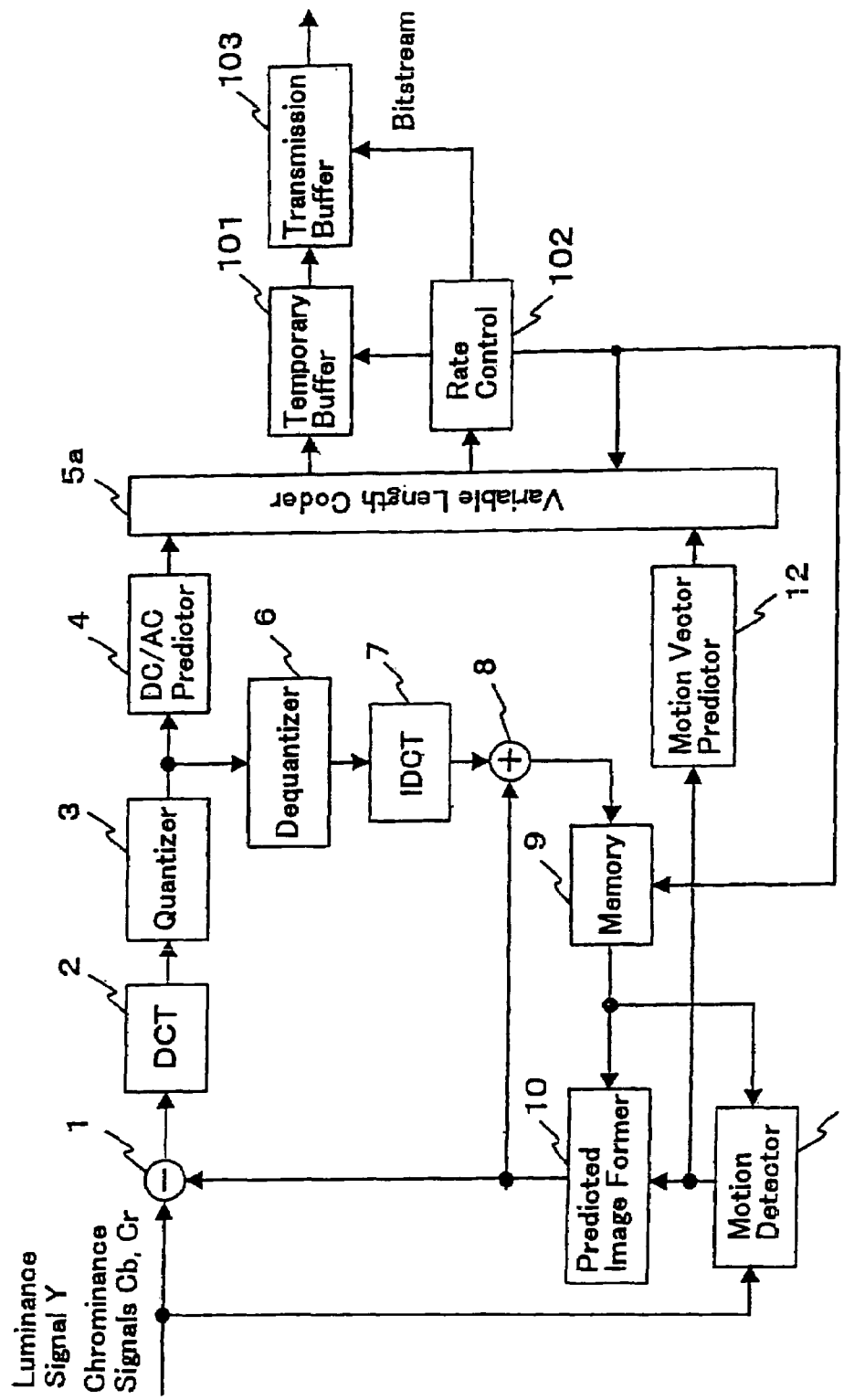
FIG. 15 is a block diagram showing Embodiment 5 of the invention.

FIG. 15 shows an coding apparatus according to Embodiment 5 of this invention. In FIG. 15, numeral 1 designates a subtracter for receiving the external input signals as its first input. The output of the subtracter 1 is inputted through the DCT 2 and the quantizer 3 to the DC/AC predictor 4 and the dequantizer 6. The output of the DC/AC predictor 4 is fed to the first input of a variable length coder 5b.

On the other hand, the output of the dequantizer 6 is fed through the IDCT 7 to the first input of the adder 8. The output of this adder 8 is fed to the first input of the memory 9, the output of which is fed to the first input of the predicted image former 10 and the first input of the motion detector 11.

The external input signal is fed to the second input of the motion detector 11, the output of which is fed to the second input of the predicted image former 10 and to the motion vector predictor 12. The output of the predicted image former 10 is fed to the second input of the subtracter 1 and the second input of the adder 8.

The output of the motion vector predictor 12 is fed to the second input of the variable length coder 5b.

The first output of the variable length coder 5b is fed to the first input of the temporary buffer 101, and the second output of the variable length coder 5b is fed to the rate control unit 102.

The temporary buffer 101 is fed at its second input with the first output of the rate control unit 102. The output of the temporary buffer 101 is fed to the first input of the transmission buffer 103.

The second output of the rate control unit 102 is fed to the second input of the memory 9 and the third input of the variable length coder 5b, and the third output of the rate control unit 102 is fed to the second input of the transmission buffer 103. The output of the transmission buffer 103 is outputted (transmitted) as the bitstream.

This bitstream outputted (transmitted) is received and decoded on the side of the decoding system.

Here will be described the operations.

Embodiment 5 is different from Embodiment 1 in the operations of the variable length coder 5b and the temporary buffer 101. The remaining portions are similar to those of Embodiment 1, so that their description will be omitted.

Figure 16:
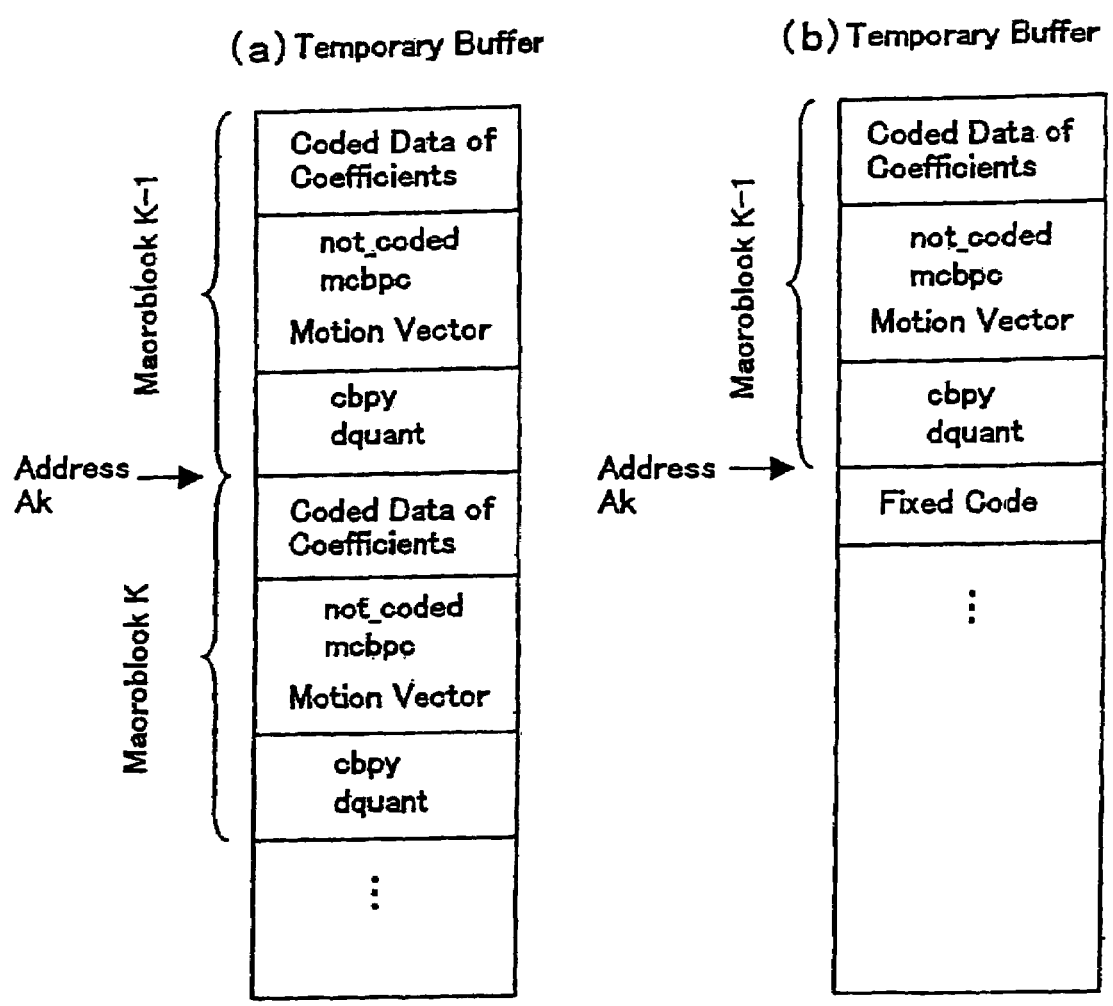
FIGS. 16a and 16b are explanatory diagrams showing the states of a temporary buffer in Embodiment 5 of the invention.

For each macroblock, the variable length coder 5b encodes the data of each macroblocks, as in Embodiment 1, and stores the codes in the temporary buffer 101, as shown in FIG. 16a. And then, the variable length coder 5b stores a leading address Ak of the codes which are stored for the current macroblock with the macroblock number K. And the number of bits mb_bit of the codes, generated for the current macroblock, is outputted to the rate control unit 102.

Next, the rate control unit 102 judges that the foregoing Relation (1) is satisfied or not. If Relation (1) holds, the rate control unit 102 controls the write address of the temporary buffer 101 to be Ak, and output the signal indicating the selection of the fixed code to the memory 9 and the variable length coder 5b.

In response to the signal indicating the selection of the fixed code, the variable length coder 5b outputs the fixed code, as predetermined for each encoding type of the VOP, to the temporary buffer 101. At this time, the write address of the temporary buffer 101 has already been returned to Ak, so that the code of the macroblock number K is overwritten with the fixed code. As in the data construction of the temporary buffer shown in FIG. 16b, therefore, the fixed code is stored next to the code of the macroblock number K–1.

In response to the flag indicating the selection of the fixed code, following operation is executed as described in Embodiment 1. That is, the memory 9 stores the constant γ in the decoded image data area of the macroblock number K, if in the I-VOP case. In memory 9, the decoded image data of the macroblock with macroblock number K in the previous VOP is copied to the decoded image area for the macroblock with macroblock number K in the current VOP, in the P-VOP case.

With the construction thus far described, in Embodiment 5, the variable length coder 5b can be given the functions of the following two elements: the elements for encoding each macroblock; and the elements for outputting the fixed code prepared for each encoding type of the VOP, thereby to reduce the size of the circuit.

Embodiment 6

Figure 17:
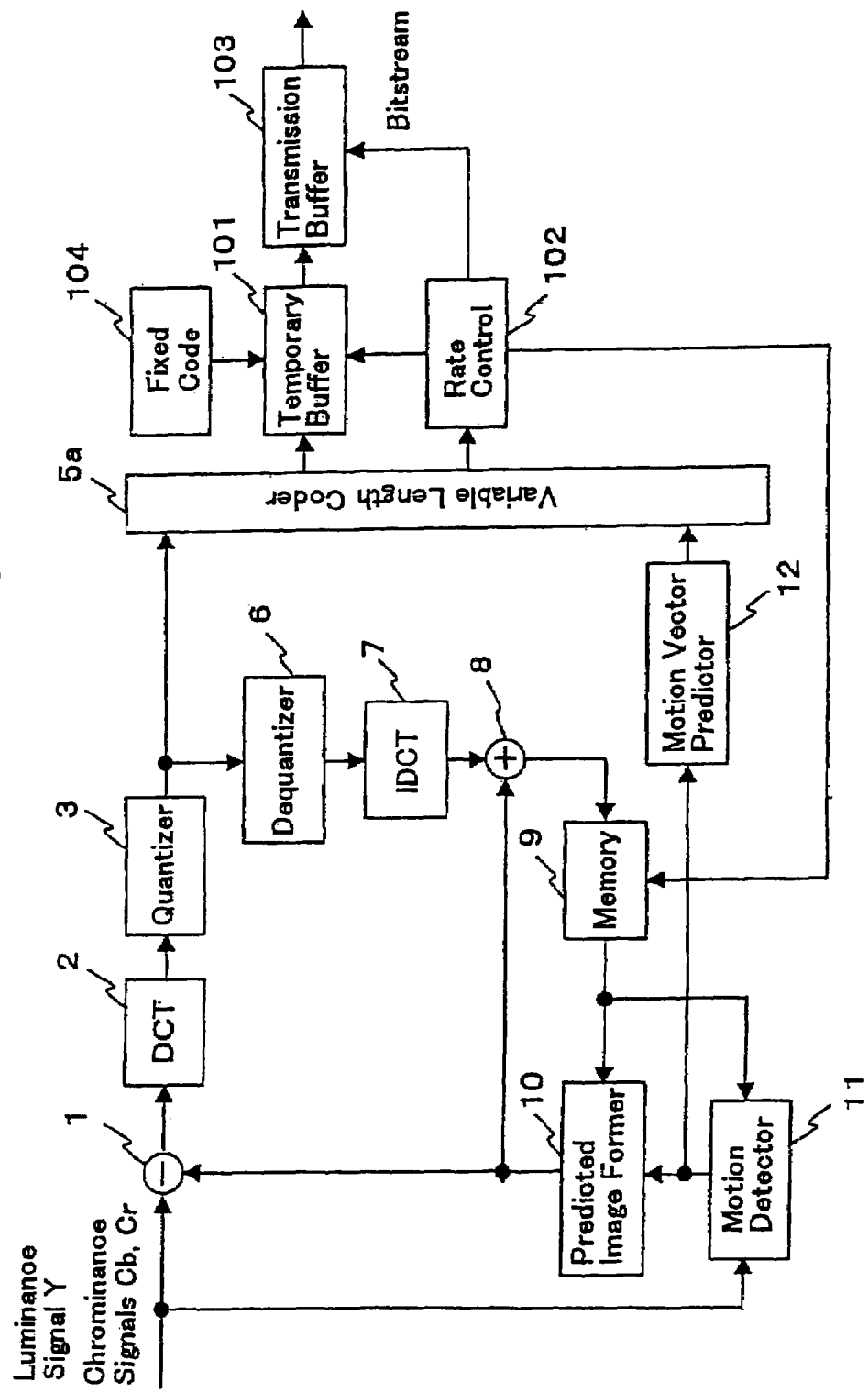
FIG. 17 is a block diagram showing Embodiment 6 of the invention.

FIG. 17 shows an encoding system according to Embodiment 6 of the invention. In FIG. 17, numeral 1 designates a subtracter for receiving the external input signals as its first input. The output of the subtracter 1 is fed through the DCT 2 and the quantizer 3 to the first input of a variable length coder 5c and the dequantizer 6.

The output of the dequantizer 6 is fed through the IDCT 7 to the first input of the adder 8. The output of this adder 8 is fed to the first input of the memory 9, the output of which is fed to the first input of the predicted image former 10 and the first input of the motion detector 11.

The external input signal is fed to the second input of the motion detector 11, the output of which is fed to the second input of the predicted image former 10 and to the motion vector predictor 12. The output of the predicted image former 10 is fed to the second input of the subtracter 1 and the second input of the adder 8.

On the other hand, the output of the motion vector predictor 12 is fed to the second input of the variable length coder 5c. Here, the encoding unit is constructed to include the aforementioned elements, from the subtracter 1 for receiving the external input signal to the variable length coder 5c for outputting the variable length code corresponding to the external input signal (although the construction disclosed herein is only one example so that it could be exemplified by the known one capable of encoding the external input signal in a corresponding manner).

The first output of the variable length coder 5c is fed to the first input of the temporary buffer 101, and the second output of the variable length coder 5c is fed to the input of the rate control unit 102.

The temporary buffer 101 is fed at its second input with the output of the fixed code output unit 104 and at its third input with the first output of the rate control unit 102. The output of the temporary buffer 101 is fed to the first input of the transmission buffer 103.

The second output of the rate control unit 102 is fed to the second input of the memory 9, and the third output of the rate control unit 102 is fed to the second input of the transmission buffer 103. The output of the transmission buffer 103 is outputted (transmitted) as the bitstream.

The bitstream thus outputted (transmitted) is received and decoded on the side of the decoding system.

Here will be described the operations.

Embodiment 6 is different from Embodiment 1 in that the DC/AC prediction is not made where the encoding type is the intra. Specifically, the variable length coder 5c encodes the quantized DCT coefficients which are outputted from the quantizer 3. In the case of the encoding system conforming to the international standard of ITU-T H.263, for example, the DC component is always encoded at 8 bits in the I-VOP.

Therefore, the fixed code output unit 104 outputs the fixed codes of the macroblock for the I-VOP, in which: the DC component of each block is 128; all the AC components are 0; and dquant=0.

Without the DC prediction of this case, therefore, a new video packet need not be constructed from the current macroblock even where the fixed code of the fixed code output unit 104 is selected. In I-VOP case, therefore, the rate control unit 102 selects either the fixed code of the fixed code output unit 104 or the output of the variable length coder 5c, and stores it in the temporary buffer 101 in accordance with the flow charts any of FIG. 9, 11, 13 or 14.

In P-VOP case, as in Embodiments 1 to 4, either the output (the fixed code) of the fixed code output unit 104 or the output of the variable length coder 5c is selected and stored in the temporary buffer 101 in accordance with the flow charts any of FIG. 9, 11, 13 or 14.

Embodiment 7

In Embodiment 6, either the output of the variable length coder 5c or the output (the fixed code) of the fixed code output unit 104 is stored in the temporary buffer 101, and is transferred from the temporary buffer 101 to the transmission buffer 103. Where the data structure is not the data partition type or where the data rearrangement does not need, the temporary buffer 101 can be omitted (in this modification, the storage unit corresponds to the transmission buffer 103). For example, the construction may be modified such that either the output of the variable length coder 5c or the output (the fixed code) of the fixed code output unit 104 is inputted directly to the transmission buffer 103.

Figure 18:
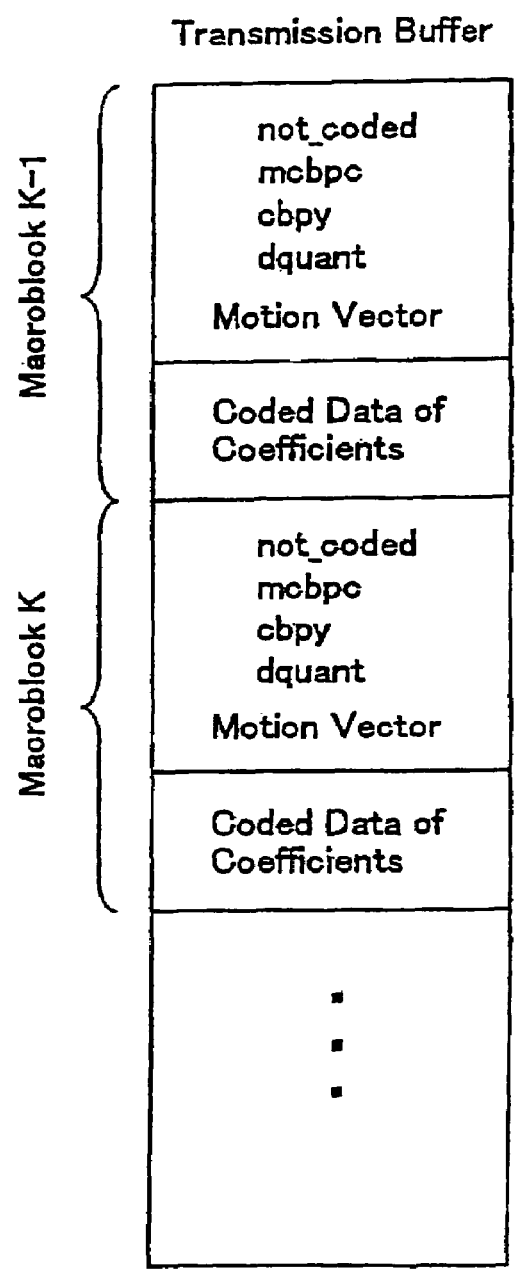
FIG. 18 is an explanatory diagram showing the state of a transmission buffer in Embodiment 7 of the invention.

In the case of the encoding system conforming to the international standard of ITU-T H.263 in the case of no data partition, for example, the bitstream to be outputted from the transmission buffer 103 has a construction shown in FIG. 18. In the case of the data partition type of the MPEG4 as shown in FIG. 7b or FIG. 8b, the codes of each macroblock are divided into following categories (1) to (3):

(1) mcbpc, dquant and the DC component, (2) ac_pred_flag and cbpy, (3) the coefficient data of each block.

But, in H.263, the codes of a plurality of macroblocks are not collectively constructed for the every category. Accordingly, it is unnecessary to rearrange the generated codes for the every macroblocks.

Therefore, if the variable length coder 5c outputs the codes of the macroblocks in accordance with the format shown in FIG. 18, the temporary buffer 101 for the rearrangement of the codes can be eliminated.

Figure 19:
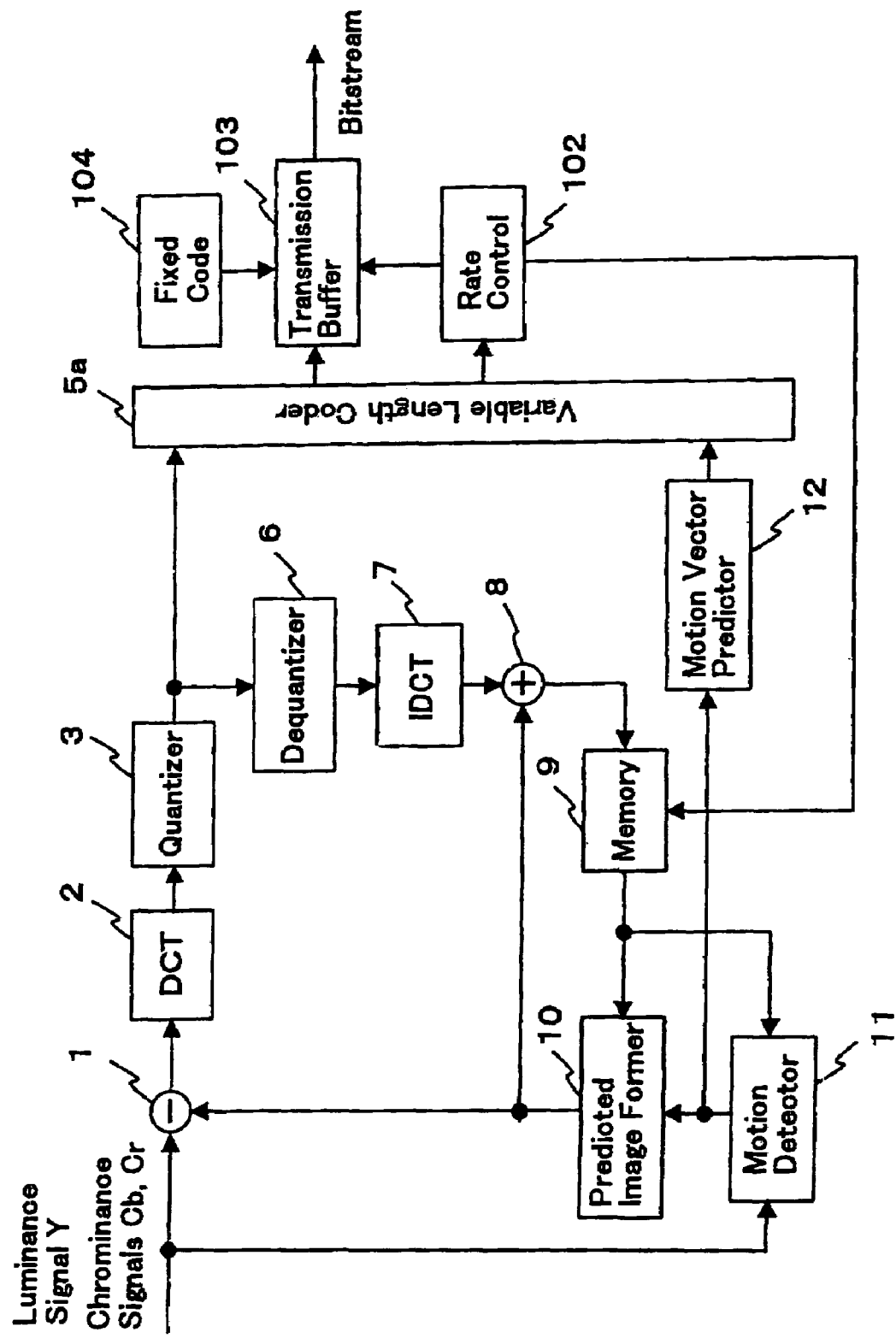
FIG. 19 is a block diagram showing Embodiment 7 of the invention.

FIG. 19 shows an encoding system according to Embodiment 7 of the invention. In FIG. 19, numeral 1 designates a subtracter for inputting the external input signals as its first input. The output of the subtracter 1 is fed through the DCT 2 and the quantizer 3 to the first input of the variable length coder 5c and to the dequantizer 6.

The output of the dequantizer 6 is fed through the IDCT 7 to the first input of the adder 8. The output of the adder 8 is fed to the first input of the memory 9, the output of which is fed to the first input of the predicted image former 10 and to the first input of the motion detector 11.

The external input signal is fed to the second input of the motion detector 11, the output of which is fed to the second input of the predicted image former 10 and to the motion vector predictor 12. The output of the predicted image former 10 is fed to the second input of the subtracter 1 and the second input of the adder 8.

The output of the motion vector predictor 12 is fed to the second input of the variable length coder 5c.

The first output of the variable length coder 5c is fed to the first input of the transmission buffer 103, and the second output of the variable length coder 5c is fed to the rate control unit 102.

The output (the fixed code) of the fixed code output unit 104 is fed to the second input of the transmission buffer 103 and the first output of the rate control unit 102 is fed to third input of the transmission buffer 103. On the other hand, the second output of the rate control unit 102 is fed to the second input of the memory 9.

The output of the transmission buffer 103 is outputted (transmitted) as the bitstream. This bitstream outputted (transmitted) is received and decoded on the side of the decoding system.

Here will be described the operations.

Embodiment 7 is different from Embodiment 6 in that the variable length coder 5c and the fixed code output unit 104 output the fixed codes to the transmission buffer 103. The rate control unit 102 judges for each macroblock which of the output of the variable length coder 5c or the output (fixed code) of the fixed code output unit 104 is to be selected, on the basis of the number of bits for the codes outputted from the variable length coder 5c, as in Embodiment 6. And the rate control unit 102 controls such that the selected output is stored in the transmission buffer 103.

Here in the foregoing Embodiments 1 to 7, in the setting of the maximum number of bits Tmax for each VOP, the reading rate R of the transmission buffer 103 is constant rate. Even if the reading rate is variable rate, the maximum number of bits Tmax can be set to prevent the overflow of the transmission buffer 103 or the underflow of the VBV buffer.

The case in which the reading rate R of the transmission buffer 103 is variable, corresponds to the case in which the maximum transmission rate is determined and the transmission rate is shared within the maximum transmission rate by the kinds (e.g., the video or the audio) of transmission information.

In this case, too, on the basis of the flow charts of FIGS. 9 to 14, by selectively storing either the output of the encoding unit for encoding each macroblock or the fixed code fixed for each encoding type of the VOP, the control can be so made that the number of bits for each VOP may not exceed the maximum value Tmax.

In the foregoing Embodiments 1 to 7, there have been described the case of the data partition type of MPEG4 and the case of the international standard of ITU-T H.263. In the case of the non data partition type or in the case of MPEG2, however, the number of bits can be controlled with a construction similar to the aforementioned ones.

Moreover, this invention or aforementioned embodiments of this invention could also be applied to the case that the input signal is not 4:2:0 video format signal or to the case in which the VOP (i.e., the unit image) is not rectangular.

The invention may be embodied in other specific forms without departing from the spirit or essential parts thereof. The above embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The entire disclosure of Japanese Patent Application No. 2000-127291 filed on Apr. 27, 2000 including specification, claims, drawings and summary are incorporated herein by reference in its entirety.

What is claimed is:

1. An encoding system comprising:
   an encoding unit operable to encode external input signals of a macroblock of a unit image, to output coded data corresponding to said external input signals;
   a fixed code output unit operable to output a fixed code predetermined for an encoding type of said unit image;
   a storage unit operable to store either said coded data outputted from said encoding unit or said fixed code outputted from said fixed code output unit for said macroblock; and a rate control unit operable to determine which of said coded data and said fixed code is stored in said storage unit in accordance with a number of bits encoded by said encoding unit for said coded data.

2. An encoding system according to claim 1, wherein said rate control unit determines a maximum number of bits, as can be generated by encoding the unit image, for each macroblock of said unit image, and determines which of the coded data outputted from said encoding unit and the fixed code outputted from said fixed code output unit on the basis of said maximum number of bits.

3. An encoding system according to claim 2, wherein said rate control unit determines the maximum number of bits on the basis of the following:

$$Tmax \leq Bs-B,$$

wherein Tmax designates the maximum number of bits, Bs designates a capacity of the storage unit, and B designates an occupied space in said storage unit.

4. An encoding system according to claim 2, wherein said fixed code output unit outputs a code, which has a minimum number of bits for the encoding type of the unit image, as the fixed code for the macroblock.

5. An encoding system comprising:
an encoding unit operable to encode external input signals of a macroblock of a unit image, to output coded data corresponding to said external input signals;
a fixed code output unit operable to output a fixed code predetermined for an encoding type of said unit image;
a storage unit operable to store either said coded data outputted from said encoding unit or said fixed code outputted from said fixed code output unit for said macroblock; and
a rate control unit operable to determine which of said coded data and said fixed code is stored in said storage unit on the basis of an elapsed time after a leading macroblock of the unit image was inputted.

6. The encoding system of claim 5, wherein the rate control unit further operable to calculate the elapsed time since a first processing unit of the input signal was received, and
select the fixed code based on a determination that the calculated elapsed time exceeds a predetermined processing time.

7. An encoding system comprising:
an encoding unit operable to encode external input signals at the unit of a macroblock of a unit image, to output coded data corresponding to said external input signals;
a fixed code output unit operable to output a fixed code predetermined for an encoding type of said unit image;
a storage unit operable to store either said coded data outputted from said encoding unit or said fixed code outputted from said fixed code output unit for said macroblock; and
a rate control unit operable to determine which of said coded data and said fixed code is stored in said storage unit on the basis of a number of bits encoded by said encoding unit for said coded data and an elapsed time after a leading macroblock of the unit image was inputted.

8. The encoding system of claim 7, wherein said rate control unit determines a maximum number of bits, as can be generated by encoding the unit image, for each macroblock of said unit image, and determines which of the coded data outputted from said encoding unit and the fixed code outputted from said fixed code output unit on the basis of said maximum number of bits.

9. An encoding method comprising:
an encoding step for encoding external input signals of each macroblock of a unit image, to output coded data corresponding to said external input signals;
a fixed code output step for outputting a fixed code predetermined for an encoding type of said unit image;
a rate control step for determining one of said coded data and said fixed code in accordance with a number of bits encoded at said encoding step for said coded data; and
a storage step for storing determined one of said coded data and said fixed code for said macroblock.

10. An encoding method according to claim 9, wherein said rate control step determines a maximum number of bits, as can be generated by encoding the unit image, determines said one of said coded data and said fixed code on the basis of said maximum number of bits.

11. An encoding method according to claim 10, wherein said rate control step determines the maximum number of bits on the basis of the following relationship:

$$Tmax \leq Bs-B,$$

wherein Tmax designates the maximum number of bits, Bs designates an allowed storage capacity, and B designates an occupied storage space.

12. An encoding method according to claim 10, wherein said fixed code output step outputs a code, which has a minimum number of bits for the encoding type of the unit image, as the fixed code for the macroblock.

13. An encoding method comprising:
an encoding step for encoding external input signals of a macroblock of a unit image, to output coded data corresponding to said external input signals;
a fixed code output step for outputting a fixed code predetermined for an encoding type of said unit image;
a rate control step for determining one of said coded data and said fixed code on the basis of an elapsed time after a leading macroblock of the unit image is inputted; and
a storage step for storing said determined one of said coded data and said fixed code for said macroblock.

14. The encoding method of claim 13, wherein the rate control step further comprises,
calculating the elapsed time since a first processing unit of the input signal was received, and
selecting the fixed code based on a determination that the calculated elapsed time exceeds a predetermined processing time.

15. An encoding method comprising:
an encoding step for encoding external input signals at a unit of a macroblock of a unit image, to output coded data corresponding to said external input signals;
a fixed code output step for outputting a fixed code predetermined for an encoding type of said unit image;
a rate control step for determining one of said coded data and said fixed code on the basis of a number of bits encoded at said encoding step for said encoded data and an elapsed time after a leading macroblock of the unit image is inputted; and
a storage step for storing said determined one of said coded data and said fixed code for said macroblock.

16. The encoding method of claim 15, wherein the rate control step further includes,
determining a maximum number of bits, as can be generated by encoding the unit image, for each macroblock of said unit image, and determining which of the coded data outputted from said encoding unit and the fixed code outputted from said fixed code output unit on the basis of said maximum number of bits.

17. A method for encoding an input signal according to an encoding type, comprising:
- generating a fixed code associated with a minimum number of bits at which a processing unit of the input signal can be encoded based on the encoding type;
- generating a variable length code for a current processing unit of the input signal based on an encoding type; and
- selecting one of the fixed code and the variable length code to encode the current processing unit, wherein the selecting step includes,
  - calculating an elapsed time since a first processing unit of the input signal was received, and
  - selecting the fixed code based on a determination that the calculated elapsed time exceeds a predetermined processing time.

18. The method according to claim 17, wherein the selecting step includes,
- determining whether using the variable length code for encoding the current processing unit would create at least one of an overflow and underflow condition in a buffer,
- wherein the selecting step selects the fixed code when the determining step determines that the overflow condition would be created.

19. The method according to claim 17, further comprising,
- calculating a maximum number of bits available in a buffer for receiving encoded signals of the current processing unit and remaining processing units of the input signal;
- calculating a sum of a number of bits in the variable length encoder and a minimum number of bits at which the remaining processing units can be encoded based on the encoding type; and
- comparing the calculated sum to the calculated maximum number of bits, wherein the determining step determines an overload condition will be created when the calculated sum exceeds the calculated maximum number of bits.

20. The method according to claim 19, wherein the step of calculating the maximum number of bits includes at least one of:
- estimating an occupied space of a decoding buffer; and
- detecting an unoccupied space of a transmission buffer.

21. An apparatus for encoding an input signal according to an encoding type, comprising:
- means for generating a fixed code associated with a minimum number of bits at which a processing unit of the input signal can be encoded based on the encoding type;
- means for generating a variable length code for a current processing unit of the input signal based on an encoding type; and
- means for selecting one of the fixed code and the variable length code to encode the current processing unit, wherein the means for selecting further includes,
  - means for calculating an elapsed time since a first processing unit of the input signal was received, and
  - means for selecting the fixed code based on a determination that the calculated elapsed time exceeds a predetermined processing time.

* * * * *